(12) United States Patent
Toyota et al.

(10) Patent No.: US 11,085,335 B2
(45) Date of Patent: Aug. 10, 2021

(54) REMODELING METHOD OF COMBINED CYCLE PLANT, DISTRIBUTION DUCT, AND COMBINED CYCLE PLANT

(71) Applicant: Mitsubishi Hitachi Power Systems, Ltd., Kanagawa (JP)

(72) Inventors: Toshihiko Toyota, Kanagawa (JP); Kuniaki Aoyama, Tokyo (JP); Jiro Asakuno, Kanagawa (JP); Masaru Takamatsu, Kanagawa (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 213 days.

(21) Appl. No.: 16/173,525

(22) Filed: Oct. 29, 2018

(65) Prior Publication Data
US 2019/0178112 A1    Jun. 13, 2019

Related U.S. Application Data

(60) Provisional application No. 62/595,787, filed on Dec. 7, 2017.

(51) Int. Cl.
*F01K 23/10*    (2006.01)
*F02C 6/18*    (2006.01)
(Continued)

(52) U.S. Cl.
CPC .............. *F01K 23/10* (2013.01); *F01D 25/30* (2013.01); *F01K 11/02* (2013.01); *F01K 13/02* (2013.01);
(Continued)

(58) Field of Classification Search
CPC .... F02C 6/00; F02C 6/18; F01K 23/10; F01K 23/101; F01D 25/30; F05D 2230/80; Y02E 20/16; Y02E 20/18
See application file for complete search history.

(56) References Cited

U.S. PATENT DOCUMENTS 3,955,358 A * 5/1976 Martz ............... F01K 13/02
60/39.182
3,965,675 A * 6/1976 Martz ............... F01K 23/108
60/39.182
(Continued)

FOREIGN PATENT DOCUMENTS

JP    2003-254011    9/2003

*Primary Examiner* — Alain Chau
(74) *Attorney, Agent, or Firm* — Wenderoth, Lind & Ponack, L.L.P.

(57) ABSTRACT

A remodeling method of a combined cycle plant including gas turbines; heat recovery steam generators provided corresponding to number of the gas turbines and configured to recover heat of flue gas discharged from the gas turbines and produce steam by the recovered heat; ducts configured to guide the flue gas from the gas turbines toward the respective heat recovery steam generators; and a steam turbine configured to be rotationally driven by the steam produced by the heat recovery steam generators. The remodeling method of a combined cycle plant includes: removing gas turbines and ducts; installing, in place of the two gas turbines, a new gas turbine that is higher in efficiency and smaller in number than the two gas turbines; and installing, in place of the ducts, a distribution duct configured to distribute and guide flue gas from the new gas turbine to two heat recovery steam generators.

6 Claims, 17 Drawing Sheets

(51) Int. Cl.
    *F22B 1/18*     (2006.01)
    *F02C 6/00*     (2006.01)
    *F01K 11/02*     (2006.01)
    *F01D 25/30*     (2006.01)
    *F01K 13/02*     (2006.01)

(52) U.S. Cl.
    CPC .............. *F01K 23/101* (2013.01); *F02C 6/00* (2013.01); *F02C 6/18* (2013.01); *F22B 1/1815* (2013.01); *F05D 2220/32* (2013.01); *F05D 2220/722* (2013.01); *F05D 2230/80* (2013.01); *F05D 2260/2322* (2013.01)

(56) References Cited

U.S. PATENT DOCUMENTS

| | | | | |
|---|---|---|---|---|
| 3,974,644 A * | 8/1976 | Martz | ........................ | F01K 9/04 60/39.182 |
| 5,628,183 A * | 5/1997 | Rice | ........................ | F01K 21/042 122/7 B |
| 5,649,416 A * | 7/1997 | Moore | ........................ | F01D 13/00 60/39.15 |
| 5,737,911 A * | 4/1998 | Hoizumi | ........................ | F01D 25/30 60/783 |
| 6,230,480 B1 * | 5/2001 | Rollins, III | ........................ | F01K 23/105 60/39.182 |
| 6,237,337 B1 * | 5/2001 | Bronicki | ........................ | F23L 15/04 60/641.12 |
| 6,321,539 B1 * | 11/2001 | Bronicki | ........................ | F02C 3/24 60/641.8 |
| 7,107,774 B2 * | 9/2006 | Radovich | ........................ | F01K 13/02 122/7 B |
| 8,061,002 B2 * | 11/2011 | Briesch | ........................ | F02C 6/18 29/401.1 |
| 9,556,753 B2 * | 1/2017 | Barckholtz | ........................ | H01M 8/0618 |
| 10,126,048 B2 * | 11/2018 | Nagao | ........................ | F25J 1/0259 |
| 10,337,403 B2 * | 7/2019 | Nagao | ........................ | F01K 23/10 |
| 10,641,177 B2 * | 5/2020 | Brostmeyer | ........................ | F02C 3/06 |
| 2008/0000237 A1 * | 1/2008 | Briesch | ........................ | F02C 6/00 60/772 |
| 2013/0269360 A1 * | 10/2013 | Wichmann | ........................ | F02C 3/107 60/773 |
| 2015/0089951 A1 * | 4/2015 | Barckholtz | ........................ | H01M 8/0625 60/772 |
| 2016/0186659 A1 * | 6/2016 | Nagao | ........................ | F02C 7/20 60/39.182 |
| 2016/0273404 A1 * | 9/2016 | Ekanayake | ........................ | F01K 23/10 |
| 2018/0066586 A1 * | 3/2018 | Brostmeyer | ........................ | F02C 6/08 |
| 2018/0284706 A1 * | 10/2018 | Anubi | ........................ | F02C 9/00 |
| 2020/0032676 A1 * | 1/2020 | Nose | ........................ | F02C 6/18 |

* cited by examiner

REMODELING METHOD OF COMBINED CYCLE PLANT, DISTRIBUTION DUCT, AND COMBINED CYCLE PLANT

TECHNICAL FIELD

The present invention relates to a remodeling method of a combined cycle plant including a gas turbine and a steam turbine, a distribution duct, and a combined cycle plant.

BACKGROUND ART

As a combined cycle plant, there is known a multi-shaft combined cycle power plant having what is called a 2-on-1 configuration, in which two gas turbine units and a single steam turbine facility are combined (see, for example, Patent Literature 1). In the multi-shaft combined cycle power plant, a gas turbine unit includes a gas turbine and a heat recovery steam generator configured to produce steam by heat discharged from the gas turbine, and one heat recovery steam generator is provided for each gas turbine.

CITATION LIST

Patent Literature

[Patent Literature 1] Japanese Patent Application Laid-open No. 2003-254011

DISCLOSURE OF INVENTION

Problem to be Solved by the Invention

Efficiency of combined cycle plants (CC efficiency) has been improving year by year. CC efficiency of old combined cycle plants decreases relatively, resulting in low economic efficiency. Thus, even when the product durability of old combined cycle plants is left, the operating rate decreases and economic loss increases. It is conceivable to install a new combined cycle plant having high CC efficiency in order to increase the economic efficiency, but the cost for newly installing the facility is large.

An object of the present invention is to provide a remodeling method of a combined cycle plant, a distribution duct, and a combined cycle plant, which are capable of improving CC efficiency while suppressing increase in cost by using an existing facility.

Means for Solving Problem

The present invention provides a remodeling method of a combined cycle plant. The combined cycle plant includes: a plurality of gas turbines; a plurality of heat recovery steam generators that are provided corresponding to the number of the gas turbines and configured to recover heat of flue gas discharged from the gas turbines and produce steam by the recovered heat; a plurality of ducts configured to guide the flue gas from the gas turbines toward the respective heat recovery steam generators; and a steam turbine configured to be rotationally driven by the steam produced by the heat recovery steam generators. The remodeling method includes: a removal step of removing the gas turbines and the ducts; a gas turbine installation step of installing, in place of the gas turbines, a new gas turbine that is higher in efficiency and smaller in number than the gas turbines; and a distribution duct installation step of installing, in place of the ducts, a distribution duct configured to distribute and guide the flue gas from the new gas turbine to the heat recovery steam generators.

With this configuration, a new gas turbine having high efficiency is installed in place of existing gas turbines, and hence CC efficiency can be improved. Even when the number of the new gas turbines is smaller than the number of the existing gas turbines, flue gas is distributed by the distribution duct, and hence the flue gas can be supplied to the existing heat recovery steam generators. In this manner, by using existing heat recovery steam generators and an existing steam turbine and replacing existing gas turbines with a new gas turbine, the CC efficiency can be improved while suppressing increase in remodeling cost.

It is preferred that the gas turbine installation step be performed after the removal step, and that the gas turbine installation step include installing the new gas turbine in a former site of the gas turbines removed at the removal step.

With this configuration, the former site of the removed existing gas turbines is a space suitable for installing a gas turbine, and hence the new gas turbine can be appropriately installed.

It is preferred that the gas turbine installation step be performed before the removal step, and that the gas turbine installation step include installing the new gas turbine in a vacant site.

With this configuration, the existing gas turbines can be operated, and hence the plant can be operated, until the removal step is performed. The gas turbine installation step is completed before the removal step is started, and hence the operation of the plant can be restarted by performing the removal step and the distribution duct installation step. Consequently, an operation suspension period of the plant due to remodeling can be shortened.

It is preferred that each of the heat recovery steam generators be a vertical heat recovery steam generator in which the flue gas flows from a lower side to an upper side in a vertical direction, and that at the distribution duct installation step, pre-remodeling connection positions at which the ducts before remodeling are connected to the heat recovery steam generators and post-remodeling connection positions at which the distribution duct after remodeling is connected to the heat recovery steam generators be different positions.

With this configuration, when the heat recovery steam generators are vertical heat recovery steam generators, the distribution duct can be connected to the post-remodeling connection position different from the pre-remodeling connection position. Consequently, the post-remodeling connection position can be set to such a position as to facilitate the routing of the distribution duct and the connection of the distribution duct.

It is preferred that the removal step include further removing the heat recovery steam generators, and that the remodeling method further include: a heat recovery steam generator installation step of installing, in place of the heat recovery steam generators, a new heat recovery steam generator provided corresponding to the number of the new gas turbines; and in place of the distribution duct installation step, a duct installation step of installing a duct configured to guide the flue gas from the new gas turbine to the new heat recovery steam generator.

With this configuration, a new heat recovery steam generator having high efficiency is installed in place of existing heat recovery steam generators, and hence CC efficiency can be further improved. The number of the new gas turbines and the number of the new heat recovery steam generators can be set to be equal to each other, and hence the flue gas is not required to be distributed. In this manner, by using an existing steam turbine, replacing existing gas turbines with a new gas turbine, and replacing existing heat recovery steam generators with a new heat recovery steam generator, the CC efficiency can be further improved while suppressing increase in remodeling cost.

It is preferred that the distribution duct installed at the distribution duct installation step be provided with a cooling device configured to cool the flue gas discharged from the new gas turbine.

With this configuration, the temperature of the flue gas discharged from the new gas turbine can be decreased by the cooling device. Specifically, the new gas turbine is higher in efficiency than an already-installed old gas turbine, and the temperature of flue gas discharged from the gas turbine having high efficiency is higher than that of the existing old gas turbine. The existing heat recovery steam generator is designed based on the existing old gas turbine, and hence if the existing heat recovery steam generator receives flue gas at high temperature, the existing heat recovery steam generator may be burnt out. Consequently, by cooling the flue gas by the cooling device, the burnout of the existing heat recovery steam generator due to heat of the flue gas can be suppressed. Examples of the cooling device include a blower fan configured to send air by taking in outside air, an ejector configured to take in outside air, and a heat exchanger such as a gas cooler, but are not limited thereto.

It is preferred that the combined cycle plant be a multi-shaft combined cycle plant in which a rotating shaft of the gas turbine and a rotating shaft of the steam turbine are separate from each other.

With this configuration, the gas turbine can be replaced while leaving the steam turbine.

The present invention provides another remodeling method of a combined cycle plant. The combined cycle plant includes: a plurality of gas turbines; a plurality of heat recovery steam generators that are provided corresponding to the number of the gas turbines and configured to recover heat of flue gas discharged from the gas turbines and produce steam by the recovered heat; a plurality of ducts configured to guide the flue gas from the gas turbines toward the respective heat recovery steam generators; and a steam turbine configured to be rotationally driven by the steam produced by the heat recovery steam generators. The remodeling method includes: a removal step of removing one or more of the gas turbines and removing the ducts while leaving at least one of the gas turbines; a gas turbine installation step of installing, in place of the removed gas turbines, a new gas turbine that is higher in efficiency than the removed gas turbines; and a distribution duct installation step of installing, in place of the ducts, a distribution duct configured to merge the flue gas from the left gas turbine and the flue gas from the new gas turbine together, and distribute and guide the merged flue gas to the heat recovery steam generators.

With this configuration, CC efficiency can be improved by installing a new gas turbine having high efficiency in place of one or more existing gas turbines while leaving at least one existing gas turbine. Even when the new gas turbine and the existing gas turbine are used in combination, the distribution duct merges the flue gas and distributes the merged flue gas, and hence the flue gas can be supplied to the existing heat recovery steam generators. By using the new gas turbine and the existing gas turbine in combination, the flue gas to be supplied to the existing heat recovery steam generators can be prevented from being insufficient. Consequently, the existing heat recovery steam generators can produce an amount of steam equivalent to that before remodeling, and the output decrease of the steam turbine can be suppressed. In this manner, by using existing heat recovery steam generators and an existing steam turbine and replacing one or more existing gas turbines with a new gas turbine, the CC efficiency can be improved while suppressing increase in remodeling cost. Specifically, the total of output of the new gas turbine and output of the existing gas turbine can be increased while maintaining the output of the steam turbine before and after remodeling, and hence the output of the entire combined cycle plant can be increased.

The present invention provides a distribution duct for connecting one or more gas turbines to a plurality of heat recovery steam generators that are larger in number than the gas turbines. The heat recovery steam generators are configured to recover heat of flue gas discharged from the gas turbines and produce steam by the recovered heat. The distribution duct includes: an upstream duct which is connected to the gas turbine and in which the flue gas from the gas turbine flows; and a plurality of downstream ducts which communicate to the upstream duct, branch off from the upstream duct, and are connected to the heat recovery steam generators to distribute the flue gas flowing through the upstream duct.

With this configuration, even when the number of gas turbines becomes smaller than the number of heat recovery steam generators due to remodeling and the like, flue gas from the gas turbine can be distributed and supplied to the heat recovery steam generators.

It is preferred that the distribution duct further include a cooling device configured to cool the flue gas from the gas turbine.

With this configuration, when the temperature of the flue gas discharged from the gas turbine is high, the flue gas is cooled by the cooling device. Consequently, the burnout of the heat recovery steam generator due to heat of the flue gas can be suppressed.

It is preferred that an allowable temperature of the flue gas and an allowable flow amount of the flue gas, which are allowed by the heat recovery steam generator, be designed in advance, and that the cooling device be configured to cool the flue gas such that a temperature of the flue gas flowing into the heat recovery steam generator becomes equal to or lower than the allowable temperature and that a flow amount of the flue gas flowing into the heat recovery steam generator becomes equal to or lower than the allowable flow amount.

With this configuration, the flue gas that is allowable on design can be caused to flow into the heat recovery steam generator, and hence the influence of the flue gas on the heat recovery steam generator can be suppressed.

It is preferred that the cooling device be a blower fan that supplies outside air into the distribution duct.

With this configuration, outside air is supplied to the flue gas, and hence the temperature of the flue gas can be easily decreased. Specific examples of the blower fan include a forced draft fan (FDF).

It is preferred that the blower fan supply the outside air in a direction opposed to a flowing direction of the flue gas.

With this configuration, the mixing of the outside air and the flue gas can be promoted, and hence an uneven heat distribution of the flue gas flowing into the heat recovery steam generators can be suppressed.

It is preferred that the blower fan be provided on an upstream side of a branch portion at which the upstream duct branches into the downstream ducts.

With this configuration, the outside air and the flue gas can be mixed in the downstream duct, and hence the mixing of the outside air and the flue gas can be further promoted.

It is preferred that the distribution duct further include a diffusion member configured to diffuse the outside air supplied from the blower fan inside the distribution duct.

With this configuration, the diffusion member can diffuse the outside air to be supplied into the duct, and hence the mixing of the outside air and the flue gas can be further promoted.

It is preferred that the cooling device be an ejector configured to take in the outside air by the flue gas flowing inside the distribution duct.

With this configuration, the outside air can be supplied to the flue gas to easily decrease the temperature of the flue gas.

It is preferred that the upstream duct and the downstream ducts are shaped to distribute the flue gas from the gas turbine equally to the heat recovery steam generators.

With this configuration, the flue gas can be equally distributed to the heat recovery steam generators, and hence the flue gas can be prevented from being excessively supplied to the heat recovery steam generators.

It is preferred that the upstream duct and the downstream ducts are shaped to be bilaterally symmetric about a flowing direction of the flue gas discharged from the gas turbine.

With this configuration, the upstream duct and the downstream ducts have a bilaterally symmetric shape, and hence the flue gas can be easily equally distributed.

It is preferred that the downstream ducts have different channel lengths from the upstream duct to the heat recovery steam generator, and that a channel area of a channel through which the flue gas flows from the upstream duct into one of the downstream ducts having a larger channel length be smaller than a channel area of a channel through which the flue gas flows from the upstream duct into one of the downstream ducts having a shorter channel length.

With this configuration, even when the downstream ducts have different channel lengths, the flue gas flowing through the downstream ducts can be equally distributed.

It is preferred that the distribution duct further include a variable damper configured to adjust a distribution amount of the flue gas to be distributed from the gas turbine to the heat recovery steam generators.

With this configuration, irrespective of the shape of the duct, the flue gas can be equally distributed by the variable damper.

It is preferred that the distribution duct further include a channel resistance member configured to adjust a channel resistance in at least one of the upstream duct and the downstream ducts.

With this configuration, the channel resistance member can adjust the flow of the flue gas in the duct to suppress a drift of the flue gas.

The present invention provides another distribution duct for connecting a plurality of gas turbines to a plurality of heat recovery steam generators. The heat recovery steam generators are configured to recover heat of flue gas discharged from the gas turbines and produce steam by the recovered heat. The distribution duct includes: a plurality of upstream ducts which are connected to the gas turbines and in which the flue gas from the gas turbines flows; a merging portion which communicates to the upstream ducts and at which the flue gases flowing through the upstream ducts merge; and a plurality of downstream ducts which communicate to the merging portion, branch off from the merging portion, and are connected to the heat recovery steam generators to distribute the flue gas flowing through the merging portion.

With this configuration, even when a new gas turbine and an existing gas turbine coexist due to remodeling and the like, flue gas from the new gas turbine and flue gas from the existing gas turbine can be mixed and thereafter the mixed flue gas can be distributed and supplied to heat recovery steam generators.

The present invention provides a combined cycle plant, including: one or more gas turbines; the above-mentioned distribution duct, which is connected to the gas turbine; a plurality of heat recovery steam generators that are connected to the distribution duct and larger in number than the gas turbine; and a steam turbine configured to be rotationally driven by steam produced by the heat recovery steam generators.

With this configuration, even when the number of gas turbines becomes smaller than the number of heat recovery steam generators due to remodeling and the like, flue gas from the gas turbine can be distributed and supplied to the heat recovery steam generators. The new gas turbine having high efficiency is installed as a gas turbine, and hence CC efficiency can be improved. In this manner, existing heat recovery steam generators and an existing steam turbine can be used, and by replacing existing gas turbines with a new gas turbine, the CC efficiency can be improved while suppressing increase in remodeling cost.

The present invention provides another combined cycle plant, including: a plurality of gas turbines having different efficiencies; the above-mentioned distribution duct, which is connected to the gas turbines; a plurality of heat recovery steam generators connected to the distribution duct; and a steam turbine configured to be rotationally driven by steam produced by the heat recovery steam generators.

With this configuration, even when a new gas turbine and an existing gas turbine coexist due to remodeling and the like, flue gas from the new gas turbine and flue gas from the existing gas turbine can be mixed and thereafter the mixed flue gas can be distributed and supplied to heat recovery steam generators. The new gas turbine having high efficiency is installed as a gas turbine, and the existing gas turbine is used in combination, and hence the flue gas to be supplied to the existing heat recovery steam generators can be prevented from being insufficient. Consequently, the existing heat recovery steam generators can produce an amount of steam equivalent to that before remodeling, and the output decrease of the steam turbine can be suppressed. In this manner, existing heat recovery steam generators and an existing steam turbine can be used, and by replacing existing gas turbines with a new gas turbine, the CC efficiency can be improved while suppressing increase in remodeling cost. Specifically, the total of output of the new gas turbine and output of the existing gas turbine can be increased while maintaining the output of the steam turbine before and after remodeling, and hence the output of the entire combined cycle plant can be increased.

BEST MODES OF CARRYING OUT THE INVENTION

Embodiments of the present invention are described in detail below with reference to the drawings. The present invention is not limited by the embodiments. Components in the following embodiments include components that can easily be replaced by a person skilled in the art or substantially the same components. The components described below can be combined as appropriate, and when there are embodiments, the embodiments can be combined as well.

First Embodiment

Figure 1:
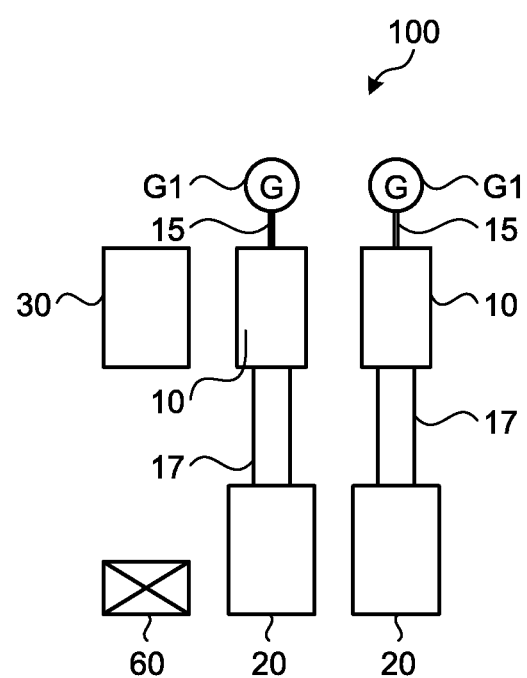
FIG. 1 is an explanatory diagram illustrating the arrangement of a GTCC power plant before remodeling according to a first embodiment.
Figure 2:
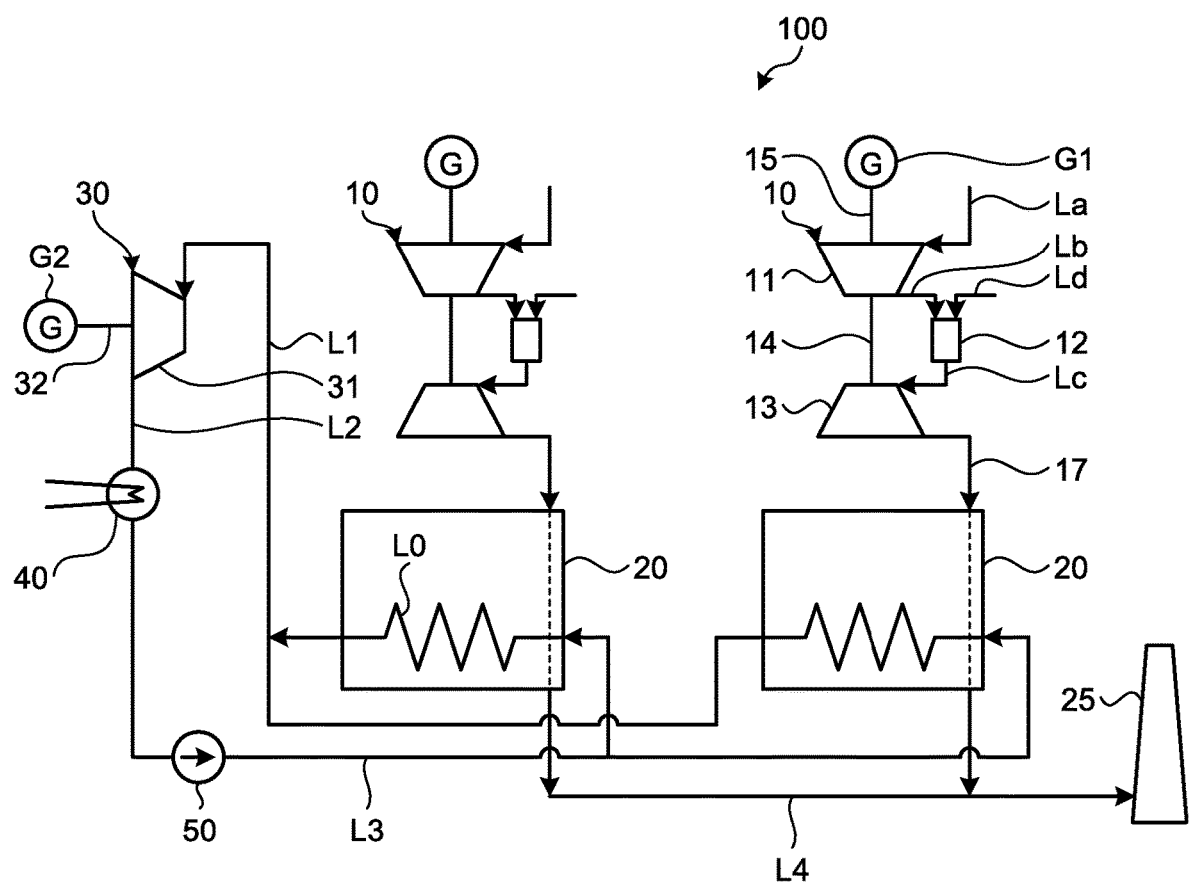
FIG. 2 is an explanatory diagram illustrating a system of the GTCC power plant before remodeling according to the first embodiment.

FIG. 1 is an explanatory diagram illustrating the arrangement of a GTCC power plant before remodeling according to a first embodiment. FIG. 2 is an explanatory diagram illustrating a system of the GTCC power plant before remodeling according to the first embodiment.

As illustrated in FIG. 1 and FIG. 2, examples of a plant to which a remodeling method of a combined cycle plant according to the first embodiment is applied include a multi-shaft gas turbine combined cycle (GTCC) power plant (hereinafter referred to as "GTCC power plant"). A GTCC power plant 100 illustrated in FIG. 1 and FIG. 2 is a plant before remodeling.

As illustrated in FIG. 1 and FIG. 2, the GTCC power plant 100 before remodeling includes a plurality of (two in the first embodiment) gas turbines 10, a plurality of (two in the first embodiment) heat recovery steam generators 20, a single steam turbine 30, a condenser 40, a water supply pump 50, and a controller 60. The GTCC power plant 100 has what is called a 2-on-1 configuration, which includes two gas turbines 10 and a single steam turbine 30. The GTCC power plant 100 is a multi-shaft combined cycle in which rotating shafts (rotors 14 described later) of the two gas turbines 10 and a rotating shaft (rotor 32 described later) of the steam turbine 30 are separate from each other.

The two gas turbines 10 are provided adjacent to each other as illustrated in FIG. 1. As illustrated in FIG. 2, each gas turbine 10 has a compressor 11, a combustor 12, and a turbine 13. The compressor 11 takes in air from an air introduction line La, and compresses the air to obtain high-temperature and high-pressure compressed air.

The combustor 12 supplies fuel to the compressed air supplied from the compressor 11 through a compressed air supply line Lb to perform combustion. A fuel supply line Ld is connected to the combustor 12. The fuel supply line Ld supplies fuel to the combustor 12.

The turbine 13 rotates with high-temperature and high-pressure combustion gas supplied from the combustor 12 through a combustion gas supply line Lc. The turbine 13 is coupled to the rotor 14 and a drive shaft 15. The rotor 14 and the drive shaft 15 rotate along with the rotation of the turbine 13. The drive shaft 15 is connected to a generator G1. The generator G1 converts rotation energy of the drive shaft 15 into electric energy, and outputs the electric energy. The turbine 13 discharges combustion gas (flue gas) having been used for the rotation.

The two heat recovery steam generators 20 are provided adjacent to each other as illustrated in FIG. 1. Two ducts 17 are provided in parallel, each between one gas turbine 10 and one heat recovery steam generator 20. Flue gas discharged from the turbine 13 in the gas turbine 10 flows through the duct 17. Each of the ducts 17 guides the flue gas from each corresponding gas turbine 10 to each corresponding heat recovery steam generator 20.

Each of the heat recovery steam generators 20 exchanges heat with flue gas flowing therein from each corresponding duct 17, and recovers heat of the flue gas to produce steam. As the heat recovery steam generator 20, for example, a vertical heat recovery steam generator 20 is applied. Flue gas is supplied to the vertical heat recovery steam generator 20 from the lower side in the vertical direction, and the supplied flue gas flows to the upper side in the vertical direction.

As illustrated in FIG. 2, the heat recovery steam generator 20 discharges the produced steam to a main steam line L1. The heat recovery steam generator 20 is a heat exchanger having a heat transfer pipe L0. Feed water flows inside the heat transfer pipe L0 as a heat medium. The heat recovery steam generator 20 exchanges heat between the feed water flowing inside the heat transfer pipe L0 and the flue gas flowing outside the heat transfer pipe L0 from the lower side to the upper side in the vertical direction, thereby heating the feed water to produce steam. The heat transfer pipe L0 connects a condensate line L3 and the main steam line L1 to each other. Each of the heat recovery steam generators 20 discharges the flue gas having been subjected to heat exchange to a flue gas line L4. A stack 25 is connected to the flue gas line L4. The flue gas discharged to the flue gas line L4 is discharged to the atmosphere through the stack 25.

The steam turbine 30 is connected to the main steam line L1. The steam turbine 30 has a turbine 31 and a rotor 32. The turbine 31 is rotated by steam supplied from the heat recovery steam generator 20 through the main steam line L1. The rotor 32 is rotated by the rotation of the turbine 31. The rotor 32 is connected to a generator G2. The generator G2 converts rotation energy of the rotor 32 into electric energy, and outputs the electric energy. The turbine 31 discharges steam having been used for the rotation to a discharge line L2.

The condenser 40 is connected to the discharge line L2. The condenser 40 condenses moisture in the steam supplied from the discharge line L2 to produce condensate. The condenser 40 discharges the produced condensate to the condensate line L3. The condensate line L3 is connected to the above-mentioned heat transfer pipe L0. Thus, condensate (feed water) supplied from the condensate line L3 flows through the heat transfer pipe L0.

The water supply pump 50 is provided in the condensate line L3. The water supply pump 50 supplies the feed water condensed by the condenser 40 to the heat transfer pipe L0 in the heat recovery steam generator 20.

The controller 60 controls the operations of the units in the GTCC power plant 100. As will be described in detail later, the controller 60 controls a variable damper 73 and a blower fan 74 provided to a distribution duct 70 in a GTCC power plant 100 after remodeling described later.

Subsequently, the operation of the GTCC power plant 100 configured as above is described. In each of the two gas turbines 10, air is compressed in the compressor 11, the compressed air and fuel are mixed and burnt in the combustor 12, and the turbine 13 is rotated by combustion gas. The generator G1 generates power by the rotation of the turbine 13. Each of the gas turbines 10 discharges the combustion gas having been used for the rotation of the turbine 13 to each corresponding duct 17 as flue gas.

The flue gas is supplied to the heat recovery steam generator 20 through the duct 17. The heat recovery steam generator 20 heats feed water by exhaust heat of the flue gas to produce steam. The steam produced by the two heat recovery steam generators 20 is discharged to the main steam line L1 and merges in the main steam line L1. The steam is supplied to the steam turbine 30 through the main steam line L1.

In the steam turbine 30, the turbine 31 is rotated by the steam supplied from the heat recovery steam generators 20. The generator G2 generates power by the rotation of the turbine 31. The steam turbine 30 discharges the steam having been used for the rotation of the turbine 31, and supplies the steam to the condenser 40 through the discharge line L2. The condenser 40 condenses moisture in the supplied steam to generate condensate, and the water supply pump 50 supplies the condensate to the heat recovery steam generators 20 through the condensate line L3.

In this manner, the generators G1 generate power by the operation of the gas turbines 10, and the generator G2 generates power by the operation of the steam turbine 30.

Figure 3:
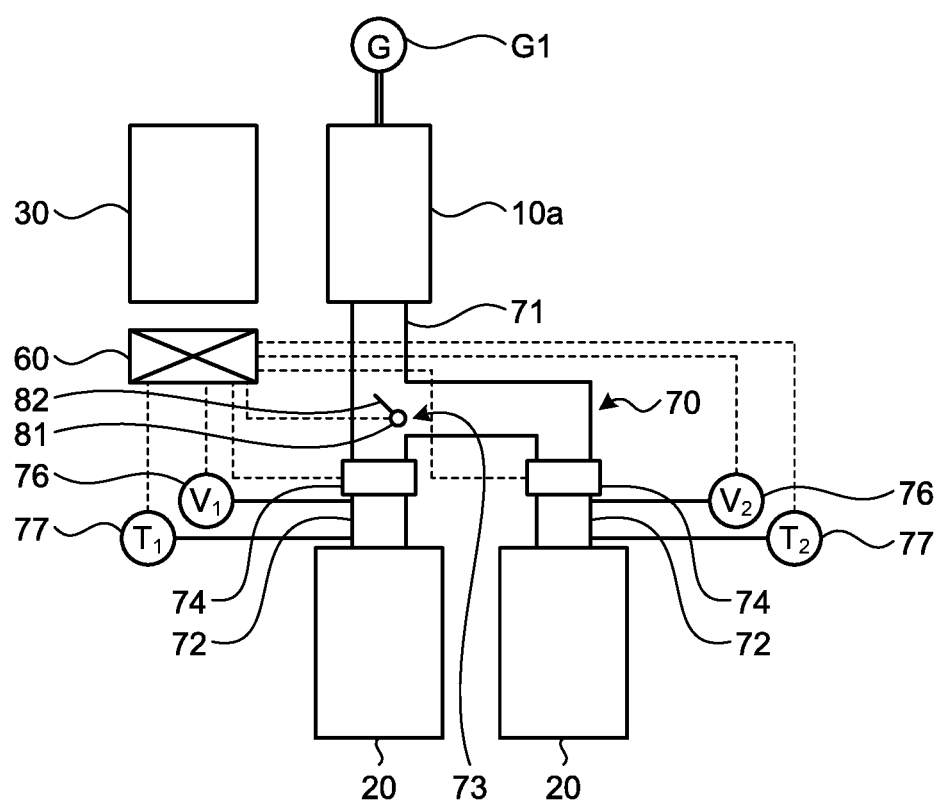
FIG. 3 is an explanatory diagram illustrating an example of the arrangement of a GTCC power plant after remodeling according to the first embodiment.
Figure 4:
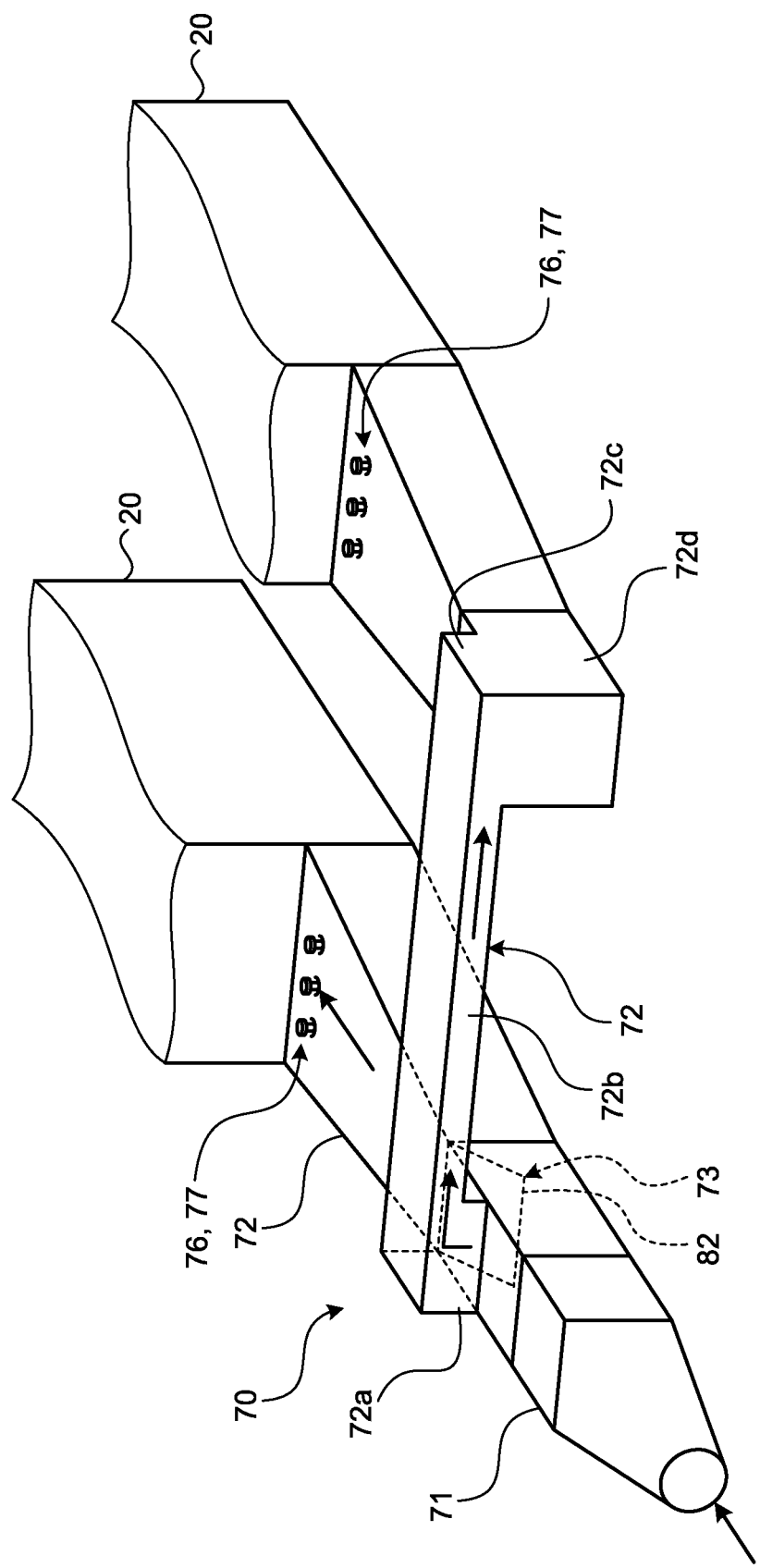
FIG. 4 is a perspective view of a distribution duct in the GTCC power plant illustrated in FIG. 3.

Next, a GTCC power plant 100 after remodeling is described with reference to FIG. 3 and FIG. 4. FIG. 3 is an explanatory diagram illustrating an example of the arrangement of the GTCC power plant after remodeling according to the first embodiment. FIG. 4 is a perspective view of a distribution duct in the GTCC power plant illustrated in FIG. 3.

As illustrated in FIG. 3, the GTCC power plant 100 after remodeling includes a single gas turbine 10a. Specifically, the GTCC power plant 100 after remodeling is obtained by replacing existing two gas turbines 10 before remodeling with a new single gas turbine 10a after remodeling. In the GTCC power plant 100 after remodeling, a distribution duct 70 is provided in place of the ducts 17.

The new gas turbine 10a has gas turbine efficiency higher than that of the gas turbine 10 before remodeling. In the gas turbine 10a having high gas turbine efficiency, the temperature of combustion gas is higher and the temperature of flue gas is also higher than those in the gas turbine 10 before remodeling. In the new gas turbine 10a, the intake flow amount taken in by the compressor 11 is larger and the exhaust flow amount of flue gas discharged from the turbine 13 is also larger than those in the gas turbine 10 before remodeling. The number of the gas turbines 10a is smaller than the number of the gas turbines 10 before remodeling. Thus, the number of the gas turbines 10a is smaller than the number of the existing heat recovery steam generators 20. The gas turbine 10a has gas turbine efficiency higher than that of the gas turbine 10 before remodeling, but has substantially the same configuration as that of the gas turbine 10 before remodeling and hence description thereof is omitted.

As illustrated in FIG. 3 and FIG. 4, the distribution duct 70 distributes and guides flue gas discharged from the single gas turbine 10a to the two heat recovery steam generators 20. As illustrated in FIG. 3 and FIG. 4, the distribution duct 70 includes an upstream duct 71, two downstream ducts 72, a variable damper 73, and two blower fans 74. The two downstream ducts 72 in the distribution duct 70 are each provided with one gas flowmeter 76 and one gas thermometer 77. The variable damper 73, the two blower fans 74, the gas flowmeters 76, and the gas thermometers 77 are connected to the controller 60.

The upstream duct 71 is connected to the gas turbine 10a, and flue gas from the gas turbine 10a flows inside the upstream duct 71. The upstream duct 71 is formed into a rectangular tubular shape, and guides the flue gas toward the two downstream ducts 72.

The two downstream ducts 72 branch off from the upstream duct 71 into two, and are connected to the two heat recovery steam generators 20. The two downstream ducts 72 are each formed to have a rectangular tubular shape, and communicate to the upstream duct 71 to guide flue gas from the upstream duct 71 toward the two heat recovery steam generators 20.

As illustrated in FIG. 3 and FIG. 4, the upstream duct 71 and one downstream duct 72 are provided to extend straight from the gas turbine 10a toward one heat recovery steam generator 20. The other downstream duct 72 branches off from a connection portion between the upstream duct 71 and the one downstream duct 72. The other downstream duct 72 is obtained by integrating four portions 72a to 72d that are provided in this order from the connection portion toward the other heat recovery steam generator 20. The portion 72a is formed to slightly extend upward in the vertical direction from the connection portion. The portion 72b is formed to extend from the portion 72a in a direction orthogonal to the direction in which the upstream duct 71 extends. The portion 72c is formed to slightly extend downward in the vertical direction from the portion 72b. The portion 72d is formed to extend from the portion 72c in a direction parallel to the direction in which the upstream duct 71 extends.

The variable damper 73 adjusts the distribution amount of flue gas to be distributed from the gas turbine 10a to the two heat recovery steam generators 20. As illustrated in FIG. 3 and FIG. 4, the variable damper 73 has a turning shaft 81, a blade 82 configured to rotate about the turning shaft 81, and a drive source (not shown) configured to allow the turning shaft 81 to be rotationally driven. The turning shaft 81 is provided along the wall surface of one downstream duct 72. The blade 82 is rotated about the turning shaft 81 to change the channel area of the one downstream duct 72. The drive source is connected to the controller 60. The driving of the drive source is controlled by the controller 60 to turn the blade 82 about the turning shaft 81.

The two blower fans 74 are provided to the two downstream ducts 72, respectively. Each of the blower fans 74 supplies outside air into the downstream duct 72 to mix flue gas discharged from the gas turbine 10a and the outside air, thereby cooling the flue gas. For example, a forced draft fan (FDF) is applied as each blower fan 74. The two blower fans 74 are connected to the controller 60, and the operations thereof are controlled by the controller 60.

In each of the heat recovery steam generators 20, the allowable temperature of flue gas and the allowable flow amount of flue gas that are allowed are designed in advance. Each of the blower fans 74 is controlled by the controller 60 such that the temperature of flue gas flowing into each heat recovery steam generator 20 becomes equal to or lower than the allowable temperature. Each of the blower fans 74 is controlled by the controller 60 such that the flow amount of flue gas flowing into each heat recovery steam generator 20 becomes equal to or lower than the allowable flow amount.

The two gas flowmeters 76 are provided to the two downstream ducts 72 on the downstream side of the blower fans 74, respectively. The gas flowmeter 76 measures the flow amount of flue gas which has been mixed with outside air and flows into the heat recovery steam generator 20. Each of the gas flowmeters 76 is connected to the controller 60, and outputs the measured flow amount of the flue gas to the controller 60.

The two gas thermometers 77 are provided to the two downstream ducts 72 on the downstream side of the blower fans 74, respectively. The gas thermometer 77 measures the temperature of the flue gas which has been mixed with outside air and flows into the heat recovery steam generator 20. Each of the gas thermometers 77 is connected to the controller 60, and outputs the measured temperature of the flue gas to the controller 60.

The controller 60 controls the variable damper 73 based on the measurement results of the two gas flowmeters 76. Specifically, the controller 60 controls the variable damper 73 such that the flow amounts of flue gas measured by the two gas flowmeters 76 are substantially the same. The controller 60 controls the drive source to rotate the turning shaft 81 and rotate the blade 82 about the turning shaft 81, thereby changing the channel area of one downstream duct 72. Based on the measurement results of the two gas flowmeters 76, the controller 60 controls the drive source such that the flow amount of flue gas flowing into one downstream duct 72 and the flow amount of flue gas flowing into the other downstream duct 72 are the same. Thus, the equally distributed flue gases are supplied to the two heat recovery steam generators 20, and the temperatures of steams generated by the two heat recovery steam generators 20 are substantially the same. Consequently, steams having a small temperature difference are supplied to the steam turbine 30 from the two heat recovery steam generators 20 through the main steam line L1.

The controller 60 controls the two blower fans 74 based on the measurement results of the two gas flowmeters 76 and the two gas thermometers 77. Specifically, the controller 60 controls the two blower fans 74 such that the flow amounts of flue gas measured by the two gas flowmeters 76 become equal to or lower than the allowable flow amount, thereby adjusting the supply amount of outside air supplied into the two downstream ducts 72. The controller 60 controls the two blower fans 74 such that the temperatures of flue gas measured by the two gas thermometers 77 become equal to or lower than the allowable temperature, thereby adjusting the supply amount of outside air supplied into the two downstream ducts 72.

Figure 5:
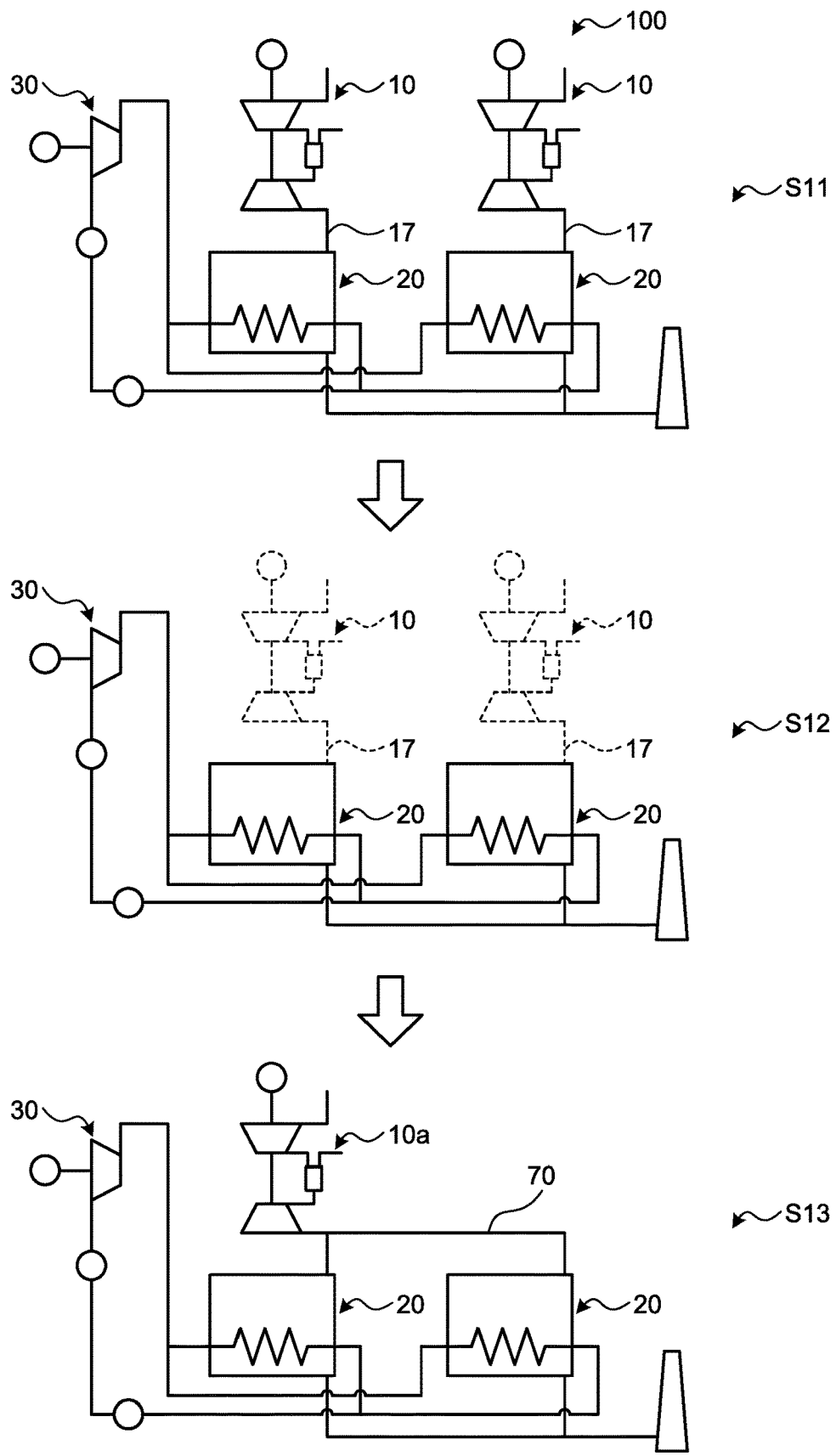
FIG. 5 is an explanatory diagram illustrating a remodeling method of the GTCC power plant according to the first embodiment.

Next, a remodeling method of the GTCC power plant 100 according to the first embodiment is described with reference to FIG. 5. FIG. 5 is an explanatory diagram illustrating the remodeling method of the GTCC power plant according to the first embodiment. The GTCC power plant 100 before remodeling is as illustrated in FIG. 1, and the GTCC power plant 100 after remodeling is as illustrated in FIG. 3.

As illustrated in FIG. 5, in the GTCC power plant 100 before remodeling, two gas turbines 10 and two heat recovery steam generators 20 are connected by two ducts 17 (Step S11). First, the two gas turbines 10 and the two ducts 17 are removed from the GTCC power plant 100 before remodeling (Step S12: removal step). After the removal step S12 is implemented, a new gas turbine 10a is installed (Step S13: gas turbine installation step). At the gas turbine installation step S13, the new gas turbine 10a is installed at a former site of the gas turbine 10 before remodeling removed at the removal step S12.

Subsequently, after the new gas turbine 10a is installed, the distribution duct 70 is installed so as to connect the new gas turbine 10a and the two existing heat recovery steam generators 20 to each other (Step S13: distribution duct installation step). At the distribution duct installation step S13, the upstream duct 71 in the distribution duct 70 is connected to the gas turbine 10a, and the two downstream ducts 72 are connected to the two heat recovery steam generators 20, respectively. A connection position (pre-remodeling connection position) between the heat recovery steam generator 20 and the duct 17 before remodeling and a connection position (post-remodeling connection position) between the heat recovery steam generator 20 and the downstream duct 72 after remodeling are the same position.

In this manner, in the GTCC power plant 100 after remodeling, a new gas turbine 10a that is higher in gas turbine efficiency than the gas turbine 10 before remodeling is provided. Even when the number of new gas turbines 10a is smaller than the number of heat recovery steam generators 20, the distribution duct 70 is provided to enable the flue gas discharged from the new gas turbine 10a to be appropriately distributed and guided to the two heat recovery steam generators 20.

As described above, according to the first embodiment, it is only necessary to use existing two heat recovery steam generators 20 and existing one steam turbine 30 and replace existing two gas turbines 10 with a new gas turbine 10a having high efficiency, and hence the CC efficiency can be improved while suppressing increase in remodeling cost.

Further, according to the first embodiment, a former site of the removed existing two gas turbines 10 is a space suitable to install a gas turbine, and hence the new gas turbine 10a can be appropriately installed.

Further, according to the first embodiment, the temperature of flue gas discharged from the new gas turbine 10a can be decreased by the blower fans 74. Consequently, by cooling the flue gas by the blower fans 74, the burnout of the existing heat recovery steam generator 20 due to heat of the flue gas can be suppressed.

Further, according to the first embodiment, the GTCC power plant 100 is a multi-shaft combined cycle, and hence the existing gas turbines 10 can be removed and replaced with the new gas turbine 10a while leaving the existing steam turbine 30.

Further, according to the first embodiment, even when the number of gas turbines 10a becomes smaller than the number of heat recovery steam generators 20 after remodeling, the distribution duct 70 can be used to distribute and supply the flue gas from the gas turbine 10a to two heat recovery steam generators 20.

Further, according to the first embodiment, the temperature and the flow amount of flue gas can be decreased to be equal to or lower than the allowable temperature and the allowable flow amount by the blower fans 74, and hence the influence of the flue gas on the heat recovery steam generators 20 can be suppressed.

Further, according to the first embodiment, by using the blower fans 74 to supply the outside air to the flue gas, the temperature of the flue gas can be easily decreased.

Further, according to the first embodiment, the variable damper 73 enables the flue gas to be equally distributed, and hence the flue gas can be prevented from being excessively supplied to each of the heat recovery steam generators 20, and the temperature difference between steams generated by the two heat recovery steam generators 20 can be reduced.

In the first embodiment, although the blower fan 74 is used as a cooling device configured to cool the flue gas, the cooling device is not limited to the blower fan 74. For example, an ejector may be used to cool the flue gas discharged from the gas turbine 10a. Alternatively, a heat exchanger such as a gas cooler may be applied as the cooling device. The cooling device is not particularly limited.

In the first embodiment, the pre-remodeling connection position at which the duct 17 and the heat recovery steam generator 20 are connected and the post-remodeling connection position at which the distribution duct 70 and the heat recovery steam generator 20 are connected are the same position, and hence the heat recovery steam generator 20 is not limited to a vertical heat recovery steam generator 20, and a horizontal heat recovery steam generator in which flue gas flows in the horizontal direction may be applied.

It is conceivable to provide the blower fan 74 in the heat recovery steam generator 20, but in this case, the outside air and the flue gas cannot be appropriately mixed, and the heat distribution of the flue gas may become uneven. It is therefore preferred to provide the blower fan 74 in the distribution duct 70 as in the first embodiment.

Second Embodiment

Next, a GTCC power plant 100 according to a second embodiment is described with reference to FIG. 6 to FIG. 13. In the second embodiment, differences from the first embodiment are described in order to avoid duplicated descriptions, and parts having the same configurations as in the first embodiment are denoted by the same reference symbols.

Figure 6:
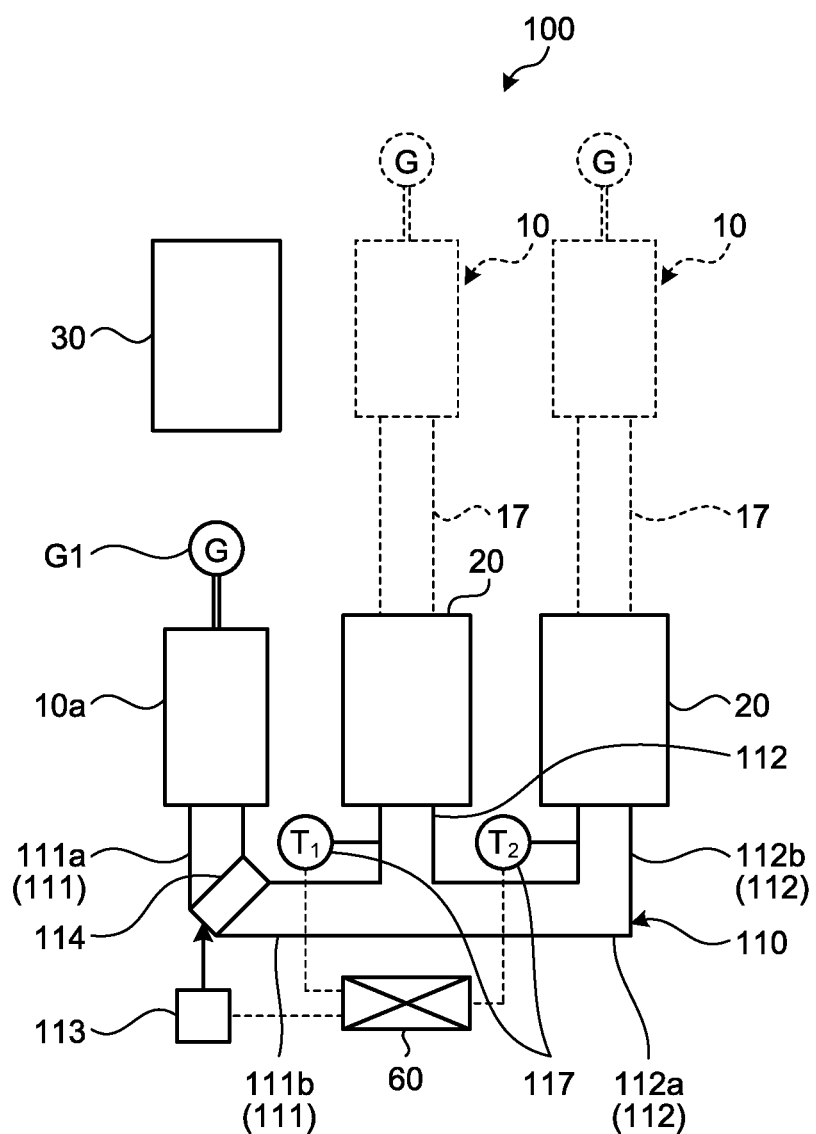
FIG. 6 is an explanatory diagram illustrating an example of the arrangement of a GTCC power plant after remodeling according to a second embodiment.
Figure 7:
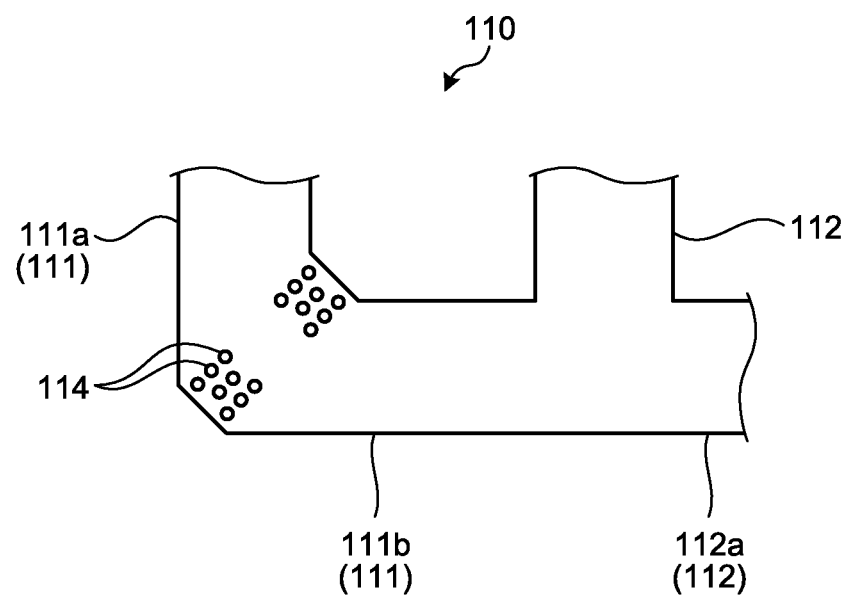
FIG. 7 is an explanatory diagram illustrating a part of a distribution duct where outside air diffusion pipes are installed.
Figure 8:
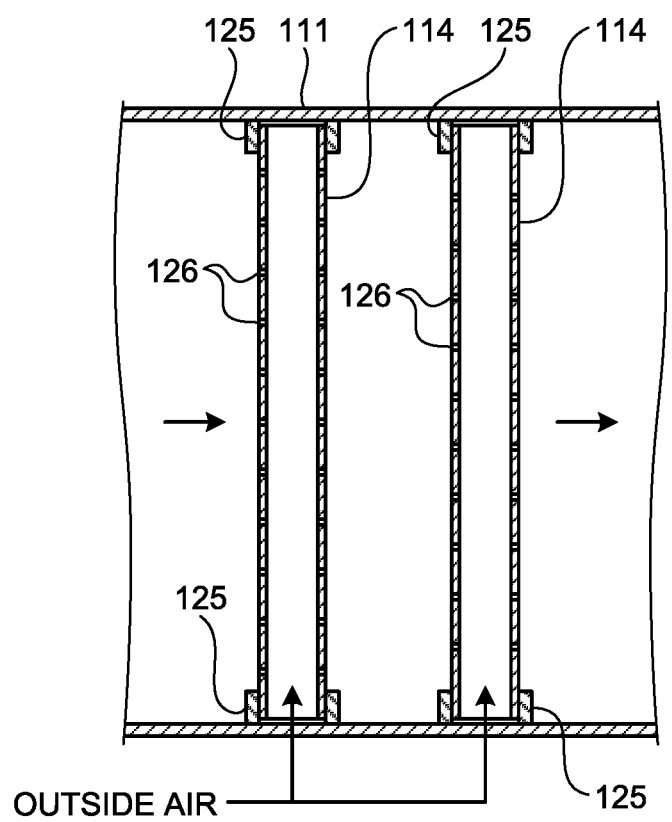
FIG. 8 is a sectional view of the outside air diffusion pipes.
Figure 9:
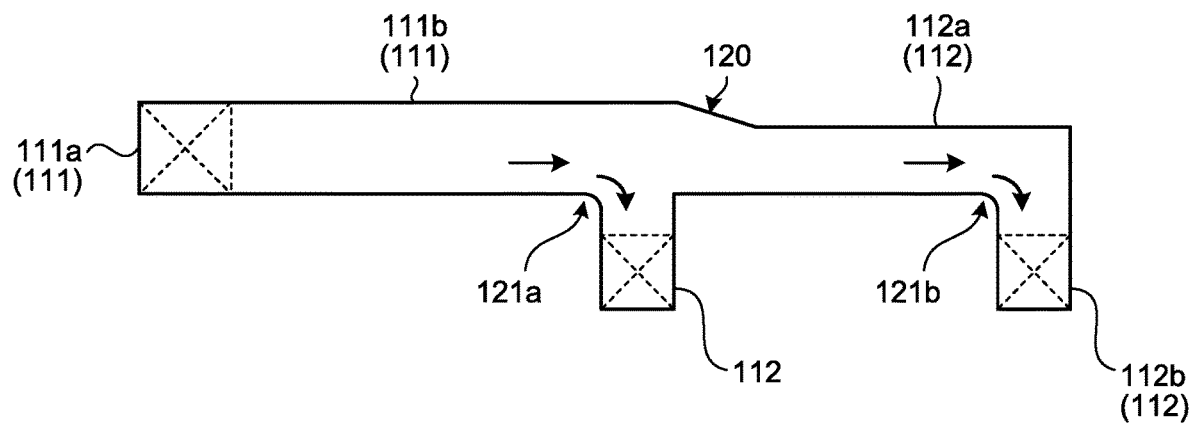
FIG. 9 is a front view of a distribution duct in the GTCC power plant illustrated in FIG. 6.
Figure 10:
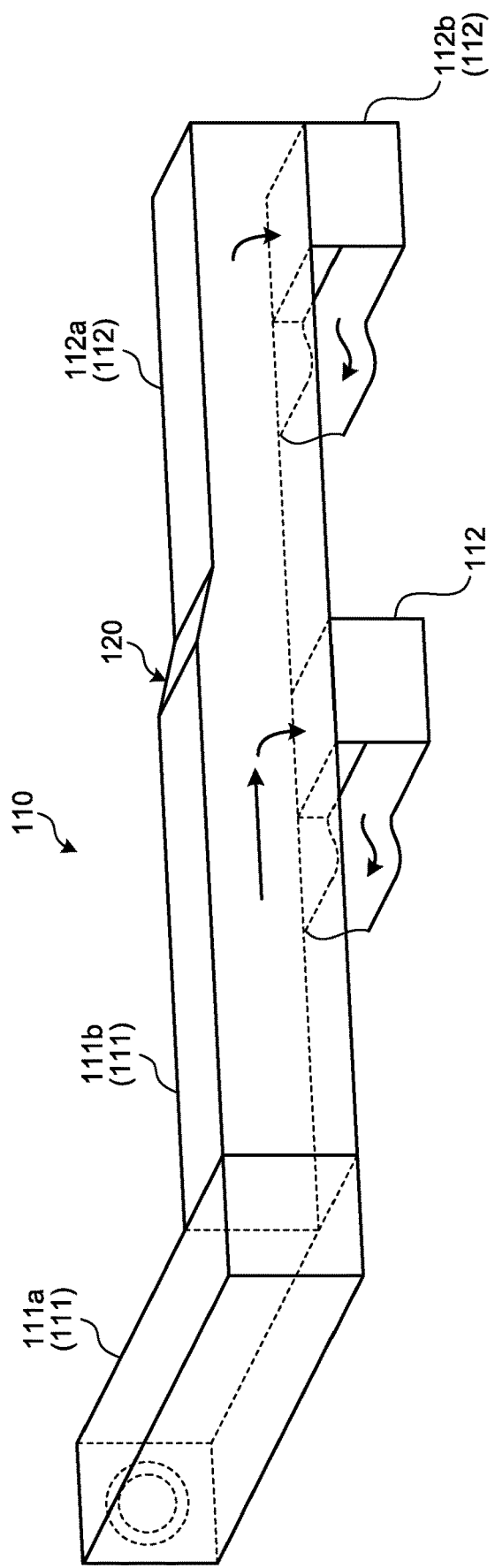
FIG. 10 is a perspective view of the distribution duct in the GTCC power plant illustrated in FIG. 6.
Figure 11:
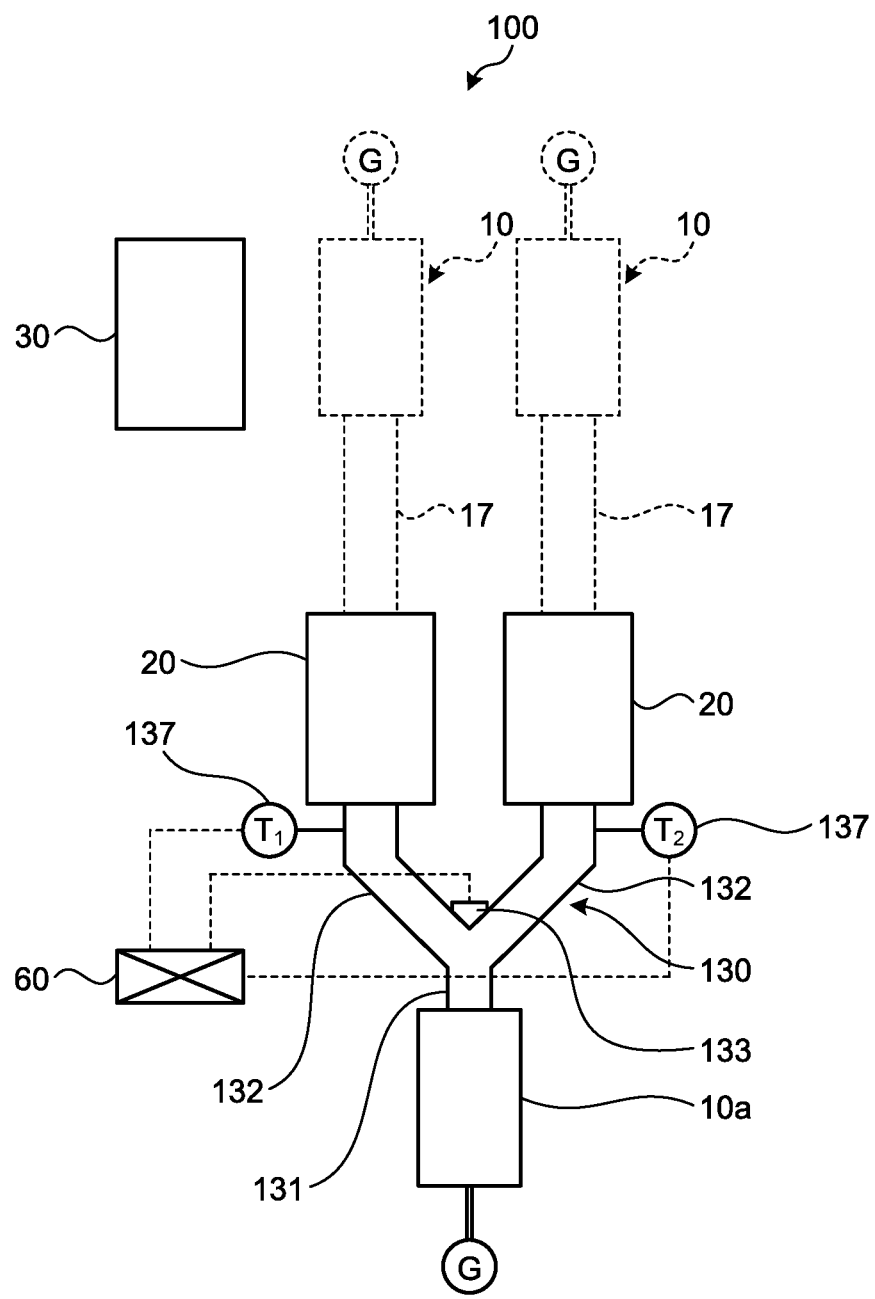
FIG. 11 is an explanatory diagram illustrating another example of the arrangement of a GTCC power plant after remodeling according to the second embodiment.
Figure 12:
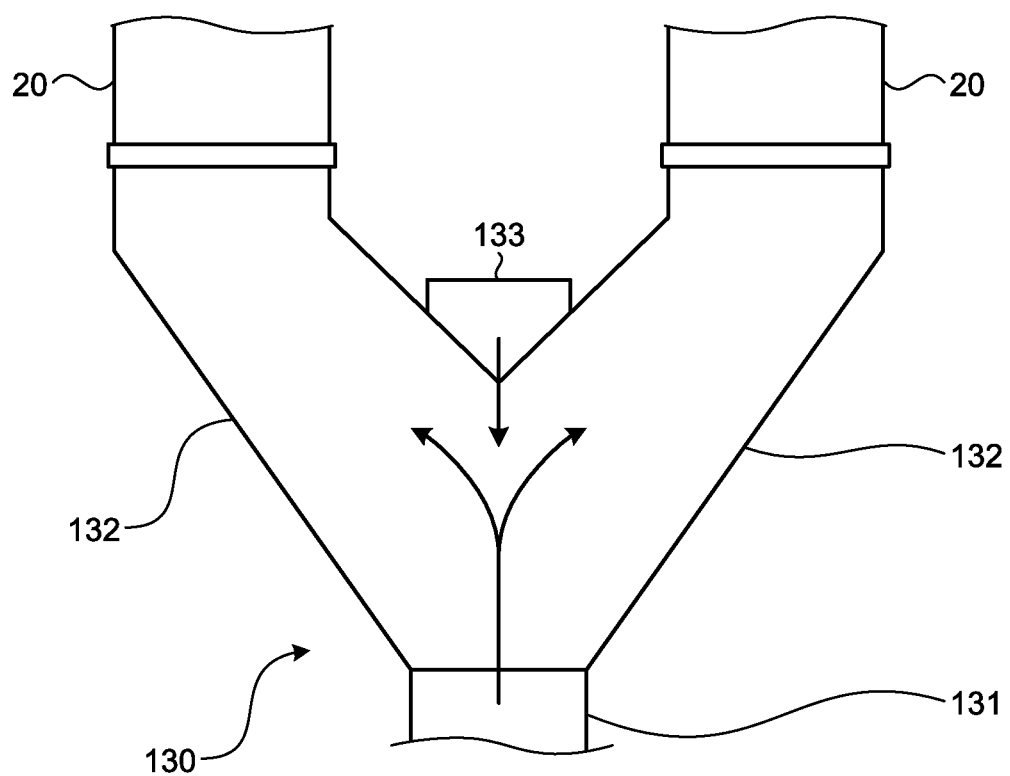
FIG. 12 is a plan view of a distribution duct in the GTCC power plant illustrated in FIG. 11.
Figure 13:
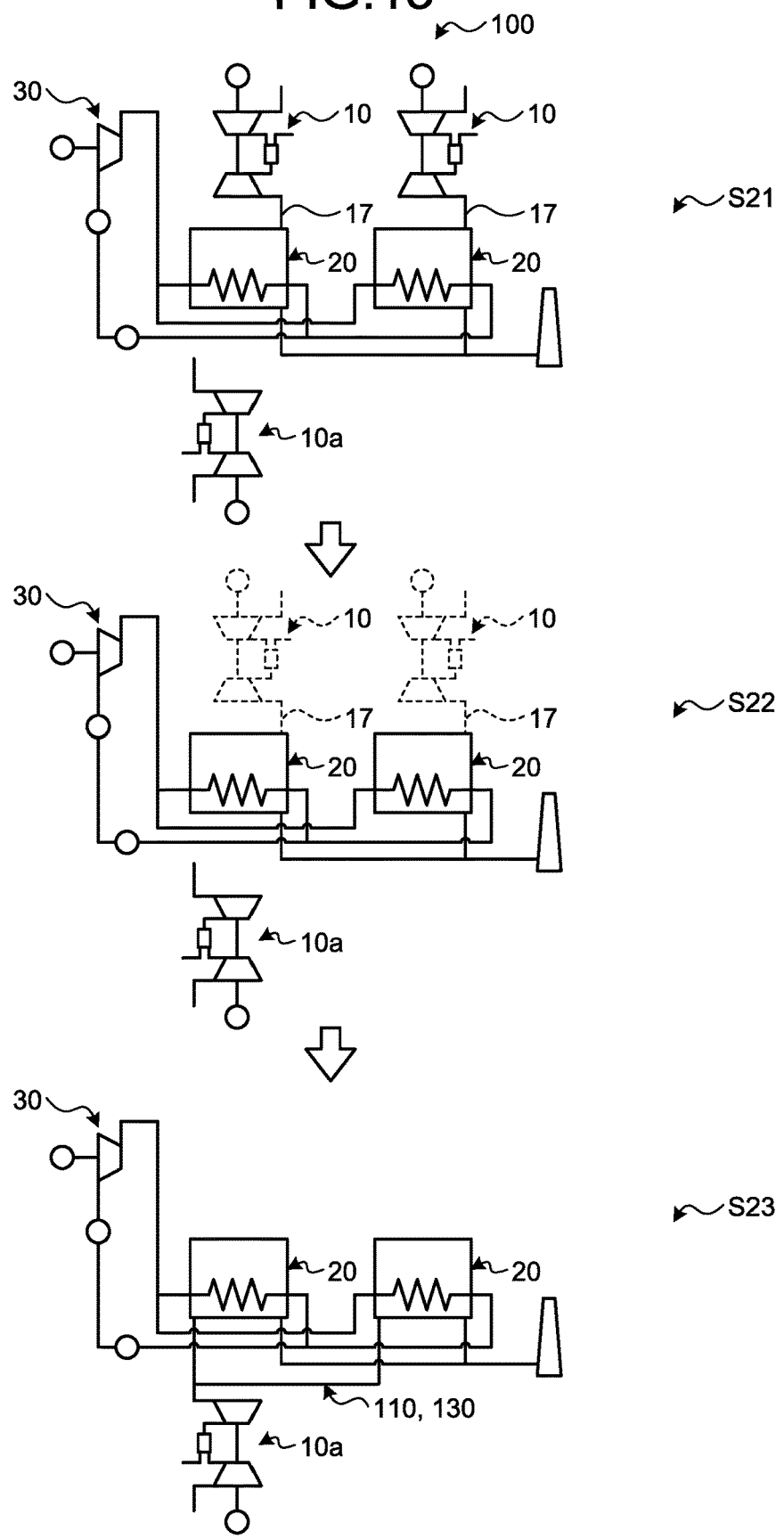
FIG. 13 is an explanatory diagram illustrating a remodeling method of the GTCC power plant according to the second embodiment.

FIG. 6 is an explanatory diagram illustrating an example of arrangement of a GTCC power plant after remodeling according to the second embodiment. FIG. 7 is an explanatory diagram illustrating a part of a distribution duct where outside air diffusion pipes are installed. FIG. 8 is a sectional view of the outside air diffusion pipes. FIG. 9 is a front view of the distribution duct in the GTCC power plant illustrated in FIG. 6. FIG. 10 is a perspective view of the distribution duct in the GTCC power plant illustrated in FIG. 6. FIG. 11 is an explanatory diagram illustrating another example of the arrangement of the GTCC power plant after remodeling according to the second embodiment. FIG. 12 is a plan view of a distribution duct in the GTCC power plant illustrated in FIG. 11. FIG. 13 is an explanatory diagram illustrating a remodeling method of the GTCC power plant according to the second embodiment.

As illustrated in FIG. 6 and FIG. 11, in the GTCC power plant 100 after remodeling according to the second embodiment, a single new gas turbine 10a is provided in place of existing two gas turbines 10. In the first embodiment, the new gas turbine 10a is installed in the former site of the removed existing gas turbine 10, but in the second embodiment, the new gas turbine 10a is installed in a vacant site in the GTCC power plant 100.

Examples of the location to install the new gas turbine 10a include a location illustrated in FIG. 6 and a location illustrated in FIG. 11. In the following description, first, a case where the new gas turbine 10a is provided in the location illustrated in FIG. 6 is described. In FIG. 6, the new gas turbine 10a is provided side by side with two heat recovery steam generators 20, and is provided on one side of the two heat recovery steam generators 20 (left side in FIG. 6). The new gas turbine 10a provided in the GTCC power plant 100 after remodeling is the same as in the first embodiment, and hence description thereof is omitted.

As illustrated in FIG. 6 to FIG. 10, a distribution duct 110 includes an upstream duct 111, two downstream ducts 112, a blower fan 113, and outside air diffusion pipes 114. Two gas thermometers 117 are provided to the two downstream ducts 112 in the distribution duct 110, respectively. The blower fan 113 and the gas thermometers 117 are connected to a controller 60.

The upstream duct 111 is connected to the gas turbine 10a, and flue gas from the gas turbine 10a flows inside the upstream duct 111. The upstream duct 111 is formed into a rectangular tubular shape, and guides the flue gas toward the two downstream ducts 112. The upstream duct 111 is obtained by integrating two portions 111a and 111b that are provided in this order from the gas turbine 10a toward the two heat recovery steam generators 20. The portion 111a is formed to extend from the gas turbine 10a in a direction (up-down direction in FIG. 6) orthogonal to the direction in which the two heat recovery steam generators 20 are arranged. The portion 111b is formed to extend from the portion 111a in the direction in which the two heat recovery steam generators 20 are arranged. The outside air diffusion pipes 114 described later are provided at a bending portion formed by the portion 111a and the portion 111b.

The two downstream ducts 112 branch off from the upstream duct 111 into two, and are connected to the two heat recovery steam generators 20. The two downstream ducts 112 are each formed to have a rectangular tubular shape, and communicate to the upstream duct 111 to guide flue gas from the upstream duct 111 toward the two heat recovery steam generators 20.

One downstream duct 112 is connected to the lower surface side of the upstream duct 111, and is provided to extend from the upstream duct 111 toward one heat recovery steam generator 20. The one downstream duct 112 is parallel to the portion 111a of the upstream duct 111.

The other downstream duct 112 is obtained by integrating two portions 112a and 112b that are provided in this order from the upstream duct 111 toward the other heat recovery steam generator 20. The portion 112a is formed to extend from the upstream duct 111 in the direction in which the two heat recovery steam generators 20 are arranged. The portion 112b is connected to the lower surface side of the portion 112a, and is provided to extend from the portion 112a toward the other heat recovery steam generator 20. The portion 112b is parallel to the portion 111a of the upstream duct 111 and the one downstream duct 112.

The channel length of the other downstream duct 112 is longer than the channel length of the one downstream duct 112. The upstream duct 111 and the two downstream ducts 112 are shaped to distribute flue gas from the gas turbine 10a equally to the two heat recovery steam generators 20. Specifically, in the two downstream ducts 112, the channel area of a channel through which flue gas flows from the upstream duct 111 into one of the downstream ducts 112 having a longer channel length is smaller than the channel area of a channel through which the flue gas flows from the upstream duct 111 into one of the downstream ducts 112 having a shorter channel length. In other words, the channel area of the channel through which the flue gas flows from the upstream duct 111 into one of the downstream ducts 112 having a shorter channel length is the channel area on the downstream side of the portion 111b of the upstream duct 111. The channel area of the channel through which the flue gas flows from the upstream duct 111 into one of the downstream ducts 112 having a longer channel length is the channel area on the upstream side of the portion 112a of the downstream duct 112. In the second embodiment, in order to reduce the channel area of the portion 112a of the other downstream duct 112 having a longer channel length, a contracted portion 120 is provided on the upstream side of the other downstream duct 112. Thus, the channel area on the upstream side of the portion 112a is smaller than the channel area on the downstream side of the portion 111b.

As illustrated in FIG. 9, a corner 121a between the upstream duct 111 and the one downstream duct 112 is formed to have a curved surface such that flue gas flows smoothly. Similarly, a corner 121b between the portion 112a and the portion 112b of the other downstream duct 112 is formed to have a curved surface such that flue gas flows smoothly.

The blower fan 113 is provided outside the duct. The blower fan 113 supplies outside air into the upstream duct 111 to mix flue gas discharged from the gas turbine 10a and the outside air, thereby cooling the flue gas. The outside air from the blower fan 113 is supplied toward the outside air diffusion pipes 114. The blower fan 113 is connected to the controller 60 similarly to the first embodiment.

The outside air diffusion pipes 114 diffuse the outside air supplied from the blower fan 113 into the flue gas flowing through the upstream duct 111. The outside air diffusion pipes 114 serve as members that create channel resistance inside the upstream duct 111. In other words, the outside air diffusion pipes 114 function as diffusion members configured to diffuse the outside air, and also function as channel resistance members that create channel resistance to the flue gas.

As illustrated in FIG. 7, the outside air diffusion pipes 114 are provided in plurality at the bending portion formed between the portion 111a and the portion 111b of the upstream duct 111. The outside air diffusion pipes 114 are provided in two sections on both sides in the width direction orthogonal to the flowing direction of the flue gas. The arrangement of the outside air diffusion pipes 114 illustrated in FIG. 7 is an example, and the outside air diffusion pipes 114 are arranged as appropriate in accordance with the flowing state of the flue gas.

As illustrated in FIG. 8, the outside air diffusion pipes 114 are each formed into a tubular shape, and are attached to the inner wall of the upstream duct 111 such that the longitudinal directions thereof are the vertical direction. The inner wall of the upstream duct 111 is provided with annular protrusions 125 for respectively fixing both ends of the outside air diffusion pipes 114, and the outside air diffusion pipes 114 are inserted on the inner side of the protrusions 125. The outside air diffusion pipes 114 are installed with a predetermined clearance from the inner wall of the upstream duct 111 in consideration of thermal elongation in the longitudinal direction caused by the heat of the flue gas.

In the outside air diffusion pipe 114, a plurality of ejection holes 126 through which the outside air is ejected are formed so as to pass through the wall thereof. The ejection holes 126 are provided along the longitudinal direction of the outside air diffusion pipe 114 at predetermined intervals so as to diffuse the outside air in the upstream duct 111. As illustrated in FIG. 8, the ejection holes 126 formed in one of adjacent outside air diffusion pipes 114 and the ejection holes 126 formed in the other of the adjacent outside air diffusion pipes 114 are shifted in position such that ejected outside airs are not opposed to each other. In other words, in the longitudinal direction, the ejection holes 126 formed in one outside air diffusion pipe 114 are located between the ejection holes 126 formed in the other outside air diffusion pipe 114.

In such a distribution duct 110, when flue gas is discharged from the gas turbine 10a, the flue gas flows through the upstream duct 111. When outside air is ejected from the outside air diffusion pipes 114, the flue gas flowing through the upstream duct 111 is mixed with the outside air, and the flue gas is cooled. The flue gas flowing through the upstream duct 111 flows toward the two downstream ducts 112. When the flue gas flows through the downstream ducts 112, the mixing of the flue gas and the outside air is promoted. The flue gas flowing through one downstream duct 112 flows into one heat recovery steam generator 20. The other downstream duct 112 has a channel area smaller than that of the one downstream duct 112 due to the contracted portion 120. Thus, the flow amount of the flue gas flowing through the other downstream duct 112 is regulated with respect to the one downstream duct 112, and the flue gas flowing through the two downstream ducts 112 is equally distributed.

Similarly to the first embodiment, the gas thermometers 117 are provided to the two downstream ducts 112. Control for the blower fan 113 by the controller 60 based on the gas thermometers 117 is the same as in the first embodiment, and hence description thereof is omitted.

Next, the case where a new gas turbine 10a is provided at a location illustrated in FIG. 11 is described. In FIG. 11, the new gas turbine 10a is provided on the side opposite to the existing two gas turbines 10 across the two heat recovery steam generators 20, and is provided to be located at the center between the two heat recovery steam generators 20 in the direction in which the two heat recovery steam generators 20 are arranged.

As illustrated in FIG. 11 and FIG. 12, a distribution duct 130 includes an upstream duct 131, two downstream ducts 132, and a blower fan 133. The two downstream ducts 132 in the distribution duct 130 are provided with two gas thermometers 137, respectively. The blower fan 133 and the gas thermometers 137 are connected to the controller 60.

The upstream duct 131 is connected to the gas turbine 10a, and flue gas from the gas turbine 10a flows inside the upstream duct 131. The upstream duct 131 is formed into a rectangular tubular shape, and guides the flue gas toward the two downstream ducts 132. The upstream duct 131 is formed to extend straight from the gas turbine 10a toward a region between the two heat recovery steam generators 20.

The two downstream ducts 132 branch off from the upstream duct 131 into two, and are connected to the two heat recovery steam generators 20. The two downstream ducts 132 are each formed into a rectangular tubular shape, and communicate to the upstream duct 131 to guide flue gas from the upstream duct 131 toward the two heat recovery steam generators 20.

The upstream duct 131 and the two downstream ducts 132 are shaped to distribute the flue gas from the gas turbine 10a equally to the two heat recovery steam generators 20. Specifically, the upstream duct 131 and the two downstream ducts 132 are shaped to be bilaterally symmetric about the flowing direction of the flue gas discharged from the gas turbine 10a. In the second embodiment, the two downstream ducts 132 are arranged to be inclined with respect to the flowing direction of the flue gas from the upstream duct 131 toward the two heat recovery steam generators 20. In this case, each of the downstream ducts 132 is formed such that the channel area is larger on the upstream side and becomes smaller toward the downstream side.

The blower fan 133 is provided at a branch portion where the upstream duct 131 branches into the two downstream ducts 132. In other words, the blower fan 133 is provided at a corner formed by the two downstream ducts 132. The blower fan 133 supplies outside air in a direction opposed to the flowing direction of flue gas. Thus, the outside air supplied from the blower fan 133 and the flue gas discharged from the gas turbine 10a are opposed to each other to promote the mixing of the outside air and the flue gas.

Similarly to the first embodiment, the gas thermometers 137 are provided to the two downstream ducts 132. Control for the blower fan 133 by the controller 60 based on the gas thermometers 137 is the same as in the first embodiment, and hence description thereof is omitted.

Next, a remodeling method of the GTCC power plant 100 according to the second embodiment is described with reference to FIG. 13. The GTCC power plant 100 before remodeling is as illustrated in FIG. 1, and the GTCC power plant 100 after remodeling is as illustrated in FIG. 6 and FIG. 11.

As illustrated in FIG. 13, in the GTCC power plant 100 before remodeling, two gas turbines 10 and two heat recovery steam generators 20 are connected by two ducts 17 (Step S21). In the GTCC power plant 100 before remodeling, first, a new gas turbine 10a is installed in a vacant site in the GTCC power plant 100 (Step S21: gas turbine installation step). During the gas turbine installation step S21, the GTCC power plant 100 before remodeling can be continuously operated.

After the gas turbine installation step S21 is implemented, the two gas turbines 10 and the two ducts 17 are removed (Step S22: removal step). During the removal step S22, the GTCC power plant 100 is in the operation suspended state. Subsequently, after the removal step S22 is implemented, the distribution duct 110 or 130 is installed so as to connect the new gas turbine 10a and the existing two heat recovery steam generators 20 to each other (Step S23: distribution duct installation step). At the distribution duct installation step S23, the upstream duct 111 or 131 in the distribution duct 110 or 130 is connected to the gas turbine 10a, and the two downstream ducts 112 or 132 are respectively connected to the two heat recovery steam generators 20. A pre-remodeling connection position between the heat recovery steam generator 20 and the duct 17 before remodeling and a post-remodeling connection position between the heat recovery steam generator 20 and the downstream ducts 112 or 132 after remodeling are different positions on opposite sides.

In this manner, also in the second embodiment, in the GTCC power plant 100 after remodeling, the new gas turbine 10a having gas turbine efficiency higher than that of the gas turbine 10 before remodeling is provided. Even when the number of the new gas turbines 10a is smaller than the number of the heat recovery steam generators 20, the flue gas discharged from the new gas turbine 10a can be appropriately distributed and guided to two heat recovery steam generators 20 by providing the distribution ducts 110 and 130.

As described above, according to the second embodiment, the gas turbine installation step S21 is performed before the removal step S22, and hence the existing two gas turbines 10 can be operated and thus the GTCC power plant 100 can be operated until the removal step S22 is performed. The gas turbine installation step S21 is completed before the removal step S22 is started, and hence the operation of the GTCC power plant 100 can be restarted by performing the removal step S22 and the distribution duct installation step S23. Consequently, the operation suspension period of the GTCC power plant 100 due to remodeling can be shortened.

Further, according to the second embodiment, the distribution duct 110 or 130 can be connected to the post-remodeling connection position different from the pre-remodeling connection position. Consequently, the post-remodeling connection position can be set to such a position as to facilitate the routing of the distribution duct 110 or 130 and the connection of the distribution duct 110 or 130. It should be noted that when the heat recovery steam generator 20 is a vertical heat recovery steam generator 20, the pre-remodeling connection position and the post-remodeling connection position can be made different from each other.

Further, according to the second embodiment, the blower fan 113 or 133 is provided on the upstream side of the branch portion between the upstream duct 111 or 131 and the two downstream ducts 112 or 132, and hence the outside air and the flue gas can be mixed in the downstream ducts 112 or 132. Consequently, the mixing of the outside air and the flue gas can be further promoted.

Further, according to the second embodiment, the outside air supplied from the blower fan 113 can be diffused in the distribution duct 110 by the outside air diffusion pipes 114 to be supplied into the upstream duct 111, and hence the mixing of the outside air and the flue gas can be further promoted.

Further, according to the second embodiment, the contracted portion 120 is provided in the distribution duct 110, and hence even when the downstream ducts 112 have different channel lengths, the flue gas flowing through the two downstream ducts 112 can be equally distributed.

Further, according to the second embodiment, the outside air diffusion pipes 114 are provided in the distribution duct 110 to adjust the flow of the flue gas in the upstream duct 111, and hence a drift of the flue gas can be suppressed.

Further, according to the second embodiment, in the distribution duct 130, the flue gas and the outside air are supplied so as to be opposed each other, and hence the mixing of the outside air and the flue gas can be promoted to suppress an uneven heat distribution of flue gas flowing into the heat recovery steam generators 20.

Further, according to the second embodiment, in the distribution duct 130, the upstream duct 131 and the two downstream ducts 132 have a bilaterally symmetric shape, and hence the flue gas flowing through the two downstream ducts 132 can be equally distributed.

Third Embodiment

Figure 14:
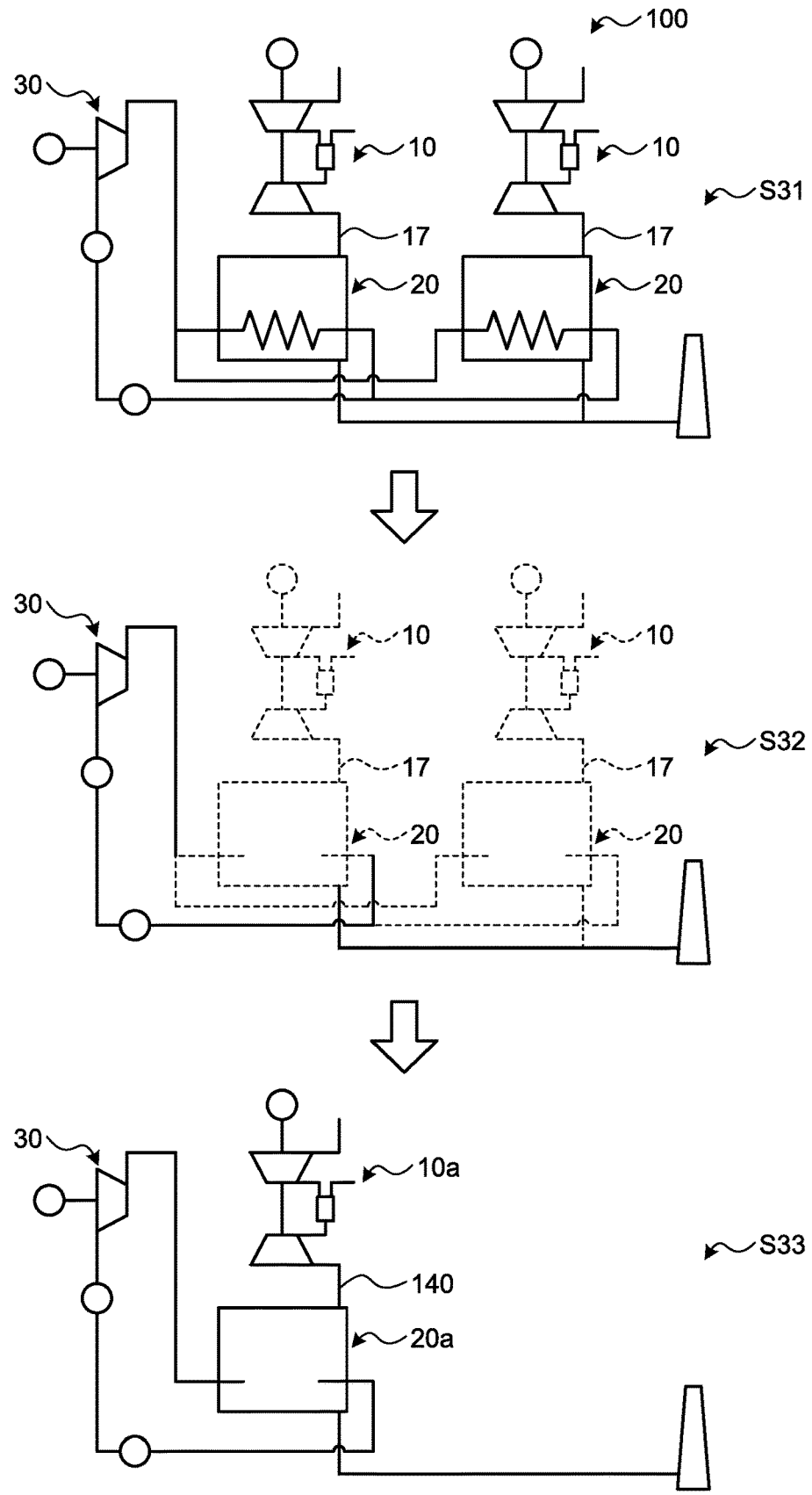
FIG. 14 is an explanatory diagram illustrating a remodeling method of a GTCC power plant according to a third embodiment.

Next, a remodeling method of a GTCC power plant 100 according to a third embodiment is described with reference to FIG. 14. Also in the third embodiment, differences from the first and second embodiments are described in order to avoid duplicated descriptions, and parts having the same configurations as in the first and second embodiments are denoted by the same reference symbols. FIG. 14 is an explanatory diagram illustrating the remodeling method of the GTCC power plant according to the third embodiment.

In the remodeling method of the GTCC power plant 100 in the third embodiment, in addition to the replacement of existing gas turbines 10 with a new gas turbine 10a, existing heat recovery steam generators 20 are replaced with a new heat recovery steam generator 20a.

The new heat recovery steam generator 20a has higher efficiency for generating steam than the heat recovery steam generators 20 before remodeling. The new heat recovery steam generator 20a is designed based on the new gas turbine 10a, and is thus capable of receiving flue gas discharged from the new gas turbine 10a.

Next, the remodeling method of the GTCC power plant 100 according to the third embodiment is described with reference to FIG. 14. The remodeling method in the third embodiment is described based on the remodeling method in the first embodiment.

As illustrated in FIG. 14, in the GTCC power plant 100 before remodeling, two gas turbines 10 and two heat recovery steam generators 20 are connected by two ducts 17 (Step S31). First, the two gas turbines 10, the two ducts 17, and the two heat recovery steam generators 20 are removed from the GTCC power plant 100 before remodeling (Step S32: removal step). After the removal step S32 is implemented, a new gas turbine 10a is installed (Step S33: gas turbine installation step). At the gas turbine installation step S33, the new gas turbine 10a is installed in a former site of the gas turbine 10 before remodeling removed at the removal step S32.

After the removal step S32 is implemented, a new heat recovery steam generator 20a is installed (Step S33: heat recovery steam generator installation step). Also at the heat recovery steam generator installation step S33, the new heat recovery steam generator 20a is installed in a former site of the heat recovery steam generator 20 before remodeling removed at the removal step S32.

Subsequently, after the new gas turbine 10a and the new heat recovery steam generator 20a are installed, a duct 140 is installed so as to connect the new gas turbine 10a and the new heat recovery steam generator 20a to each other (Step S33: duct installation step). At the duct installation step S33, the duct 140 is connected in order to guide flue gas from the single gas turbine 10a to the single heat recovery steam generator 20a, which is substantially the same as the ducts 17 used before remodeling.

As described above, according to the third embodiment, the new heat recovery steam generator 20a having high efficiency is installed in place of the existing two heat recovery steam generators 20, and hence the CC efficiency can be further improved. The number of the new gas turbines 10a and the number of the new heat recovery steam generators 20a can be set to be equal to each other, and hence the flue gas is not required to be distributed. In this manner, it is only necessary to use the existing steam turbine 30, replace the existing two gas turbines 10 with the new gas turbine 10a, and replace the existing two heat recovery steam generators 20 with the new heat recovery steam generator 20a, and hence the CC efficiency can be further improved while suppressing increase in remodeling cost.

Fourth Embodiment

Figure 15:
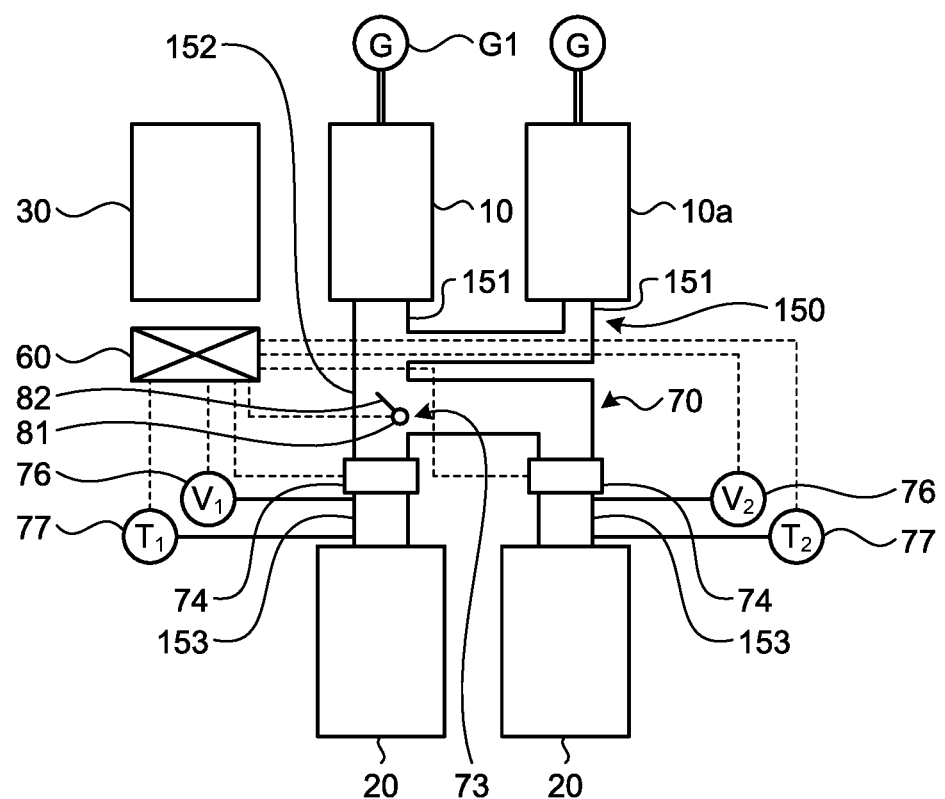
FIG. 15 is an explanatory diagram illustrating an example of the arrangement of a GTCC power plant after remodeling according to a fourth embodiment.
Figure 16:
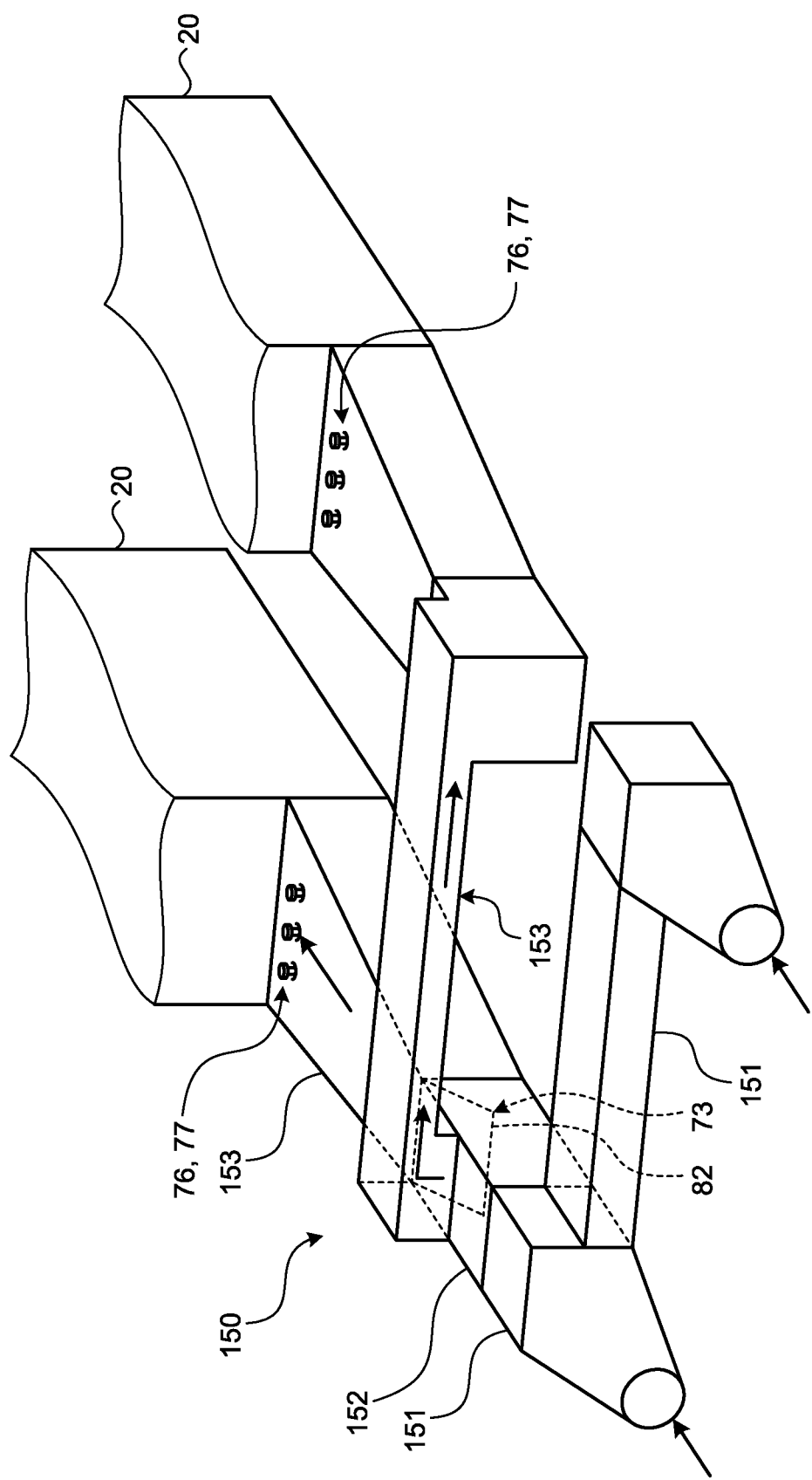
FIG. 16 is a perspective view of a distribution duct in the GTCC power plant illustrated in FIG. 15.
Figure 17:
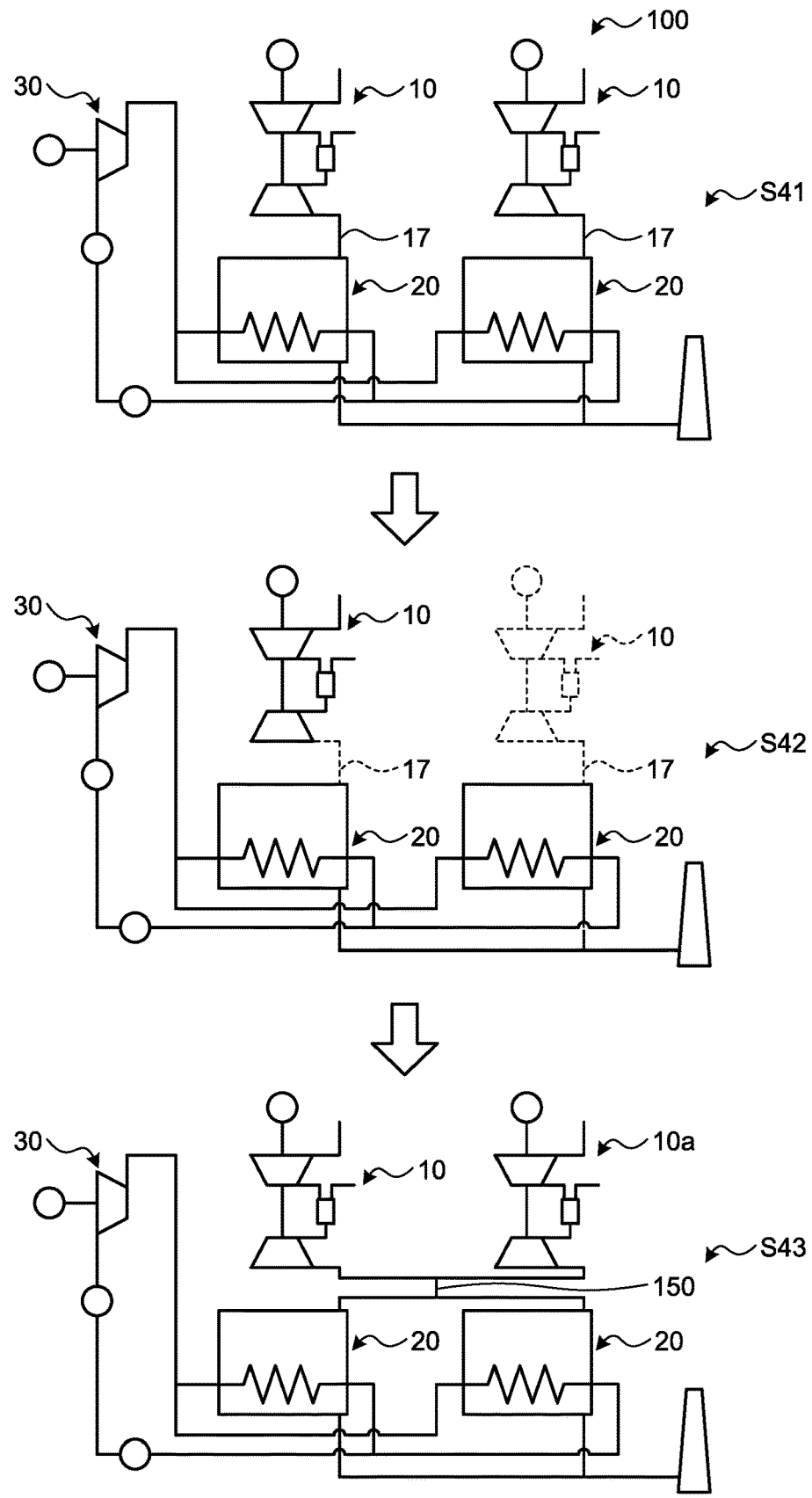
FIG. 17 is an explanatory diagram illustrating a remodeling method of the GTCC power plant according to the fourth embodiment.

Next, a remodeling method of a GTCC power plant 100 according to a fourth embodiment is described with reference to FIG. 15 to FIG. 17. Also in the fourth embodiment, differences from the first to third embodiments are described in order to avoid duplicated descriptions, and parts having the same configurations as in the first to third embodiments are denoted by the same reference symbols for description. FIG. 15 is an explanatory diagram illustrating an example of arrangement of a GTCC power plant after remodeling according to the fourth embodiment. FIG. 16 is a perspective view of a distribution duct in the GTCC power plant illustrated in FIG. 15. FIG. 17 is an explanatory diagram illustrating a remodeling method of the GTCC power plant according to the fourth embodiment.

In the first embodiment, a new single gas turbine 10a is installed in place of two existing gas turbines 10, but in the fourth embodiment, a new single gas turbine 10a is installed in place of one existing gas turbine 10 of the two existing gas turbines 10. In other words, in the GTCC power plant 100 after remodeling in the fourth embodiment, as illustrated in FIG. 15, a single existing gas turbine 10 and a single new gas turbine 10a are provided. In the GTCC power plant 100 after remodeling, a distribution duct 150 is provided in place of ducts 17. The new gas turbine 10a to be provided in the GTCC power plant 100 after remodeling is the same as in the first embodiment, and hence description thereof is omitted.

As illustrated in FIG. 15 and FIG. 16, the distribution duct 150 includes two upstream ducts 151, a merging portion 152, two downstream ducts 153, a variable damper 73, and two blower fans 74. The two downstream ducts 153 in the distribution duct 150 are each provided with one gas flowmeter 76 and one gas thermometer 77. The variable damper 73, the two blower fans 74, the gas flowmeters 76, and the gas thermometers 77 are connected to the controller 60. The variable damper 73, the two blower fans 74, the two gas flowmeters 76, and the two gas thermometers 77 are the same as in the first embodiment, and hence description thereof is omitted.

Of the two upstream ducts 151, one upstream duct 151 is connected to the new gas turbine 10a, and flue gas from the gas turbine 10a flows inside the one upstream duct 151, while the other upstream duct 151 is connected to the existing gas turbine 10, and flue gas from the gas turbine 10 flows inside the other upstream duct 151. The two upstream ducts 151 are each formed into a rectangular tubular shape, and guide the flue gas toward the merging portion 152.

The merging portion 152 is formed into a rectangular tubular shape, and the flue gas from the gas turbine 10a and the flue gas from the gas turbine 10 flow therethrough while being mixed. The merging portion 152 guides the flue gas to the two downstream ducts 153.

The two downstream ducts 153 branch off from the merging portion 152 into two, and are connected to the two heat recovery steam generators 20. The two downstream ducts 153 are each formed into a rectangular tubular shape, and communicate to the merging portion 152 to guide flue gas from the merging portion 152 toward the two heat recovery steam generators 20.

The variable damper 73 is provided at the merging portion 152, and adjusts the distribution amount of flue gas to be distributed from the merging portion 152 to the two heat recovery steam generators 20.

As illustrated in FIG. 15 and FIG. 16, one upstream duct 151, the merging portion 152, and one downstream duct 153 are provided to extend straight from the gas turbine 10 toward one heat recovery steam generator 20. The other upstream duct 151 is connected to merge toward the one upstream duct 151. The other downstream duct 153 branches off from a connection portion between the merging portion 152 and the one downstream duct 153. The other downstream duct 153 is the same as the other downstream duct 72 in the first embodiment, and hence description thereof is omitted.

In such a GTCC power plant 100 after remodeling, the new gas turbine 10a is operated as a main gas turbine, and the existing gas turbine 10 is operated as a sub gas turbine. Specifically, the allowable flow amount of flue gas that is allowed is designed in advance for the two heat recovery steam generators 20, and hence in the case where the flue gas discharged when the new gas turbine 10a is operated does not reach the allowable flow amount of the two heat recovery steam generators 20, the existing gas turbine 10 is operated. In other words, the existing gas turbine 10 is operated when the flow amount of the flue gas discharged from the new gas turbine 10a is insufficient with respect to the allowable flow amount of the two heat recovery steam generators 20. In this case, the existing gas turbine 10 is set such that the opening degree of an inlet guide vane (IGV) configured to adjust the flow amount of air taken in by the compressor 11 is minimum. In the existing gas turbine 10, the opening degree of the IGV may be any opening degree as long as an amount of flue gas corresponding to the shortage can be supplied.

Next, a remodeling method of a GTCC power plant 100 according to the fourth embodiment is described with reference to FIG. 17. The remodeling method in the fourth embodiment is described based on the remodeling method in the first embodiment.

As illustrated in FIG. 17, in the GTCC power plant 100 before remodeling, two gas turbines 10 and two heat recovery steam generators 20 are connected by two ducts 17 (Step S41). First, one gas turbine 10 and the two ducts 17 are removed from the GTCC power plant 100 before remodeling (Step S42: removal step). After the removal step S42 is implemented, a new gas turbine 10a is installed (Step S43: gas turbine installation step).

Subsequently, after the new gas turbine 10a is installed, the distribution duct 150 is installed so as to connect the new gas turbine 10a and the existing gas turbine 10 to the existing two heat recovery steam generators 20, respectively (Step S43: duct installation step).

As described above, according to the fourth embodiment, a new gas turbine 10a having high efficiency is installed in place of one existing gas turbine 10 while leaving the other one existing gas turbine 10, and hence CC efficiency can be improved. Even when the new gas turbine 10a and the existing gas turbine 10 are used in combination, the distribution duct 150 merges the flue gas and thereafter distributes the merged flue gas, and hence the flue gas can be supplied to existing two heat recovery steam generators 20. By using the new gas turbine 10a and the existing gas turbine 10 in combination, the flow amount of flue gas to be supplied to the existing two heat recovery steam generators 20 can be prevented from being insufficient. Consequently, the existing two heat recovery steam generators 20 can produce an amount of steam equivalent to that before remodeling, and the output decrease of the steam turbine 30 can be suppressed. In this manner, by using the existing two heat recovery steam generators 20 and the existing steam turbine 30 and replacing one existing gas turbine 10 with the new gas turbine 10a, the CC efficiency can be improved while suppressing increase in remodeling cost. Specifically, the total of output of the new gas turbine 10a and output of the existing gas turbine 10 can be increased while maintaining the output of the steam turbine 30 before and after remodeling, and hence the output of the entire GTCC power plant 100 can be increased.

EXPLANATIONS OF LETTERS OR NUMERALS

G1, G2 generator
La air introduction line
Lb compressed air supply line
Lc combustion gas supply line
Ld fuel supply line
L0 heat transfer pipe
L1 main steam line
L2 discharge line
L3 condensate line
L4 flue gas line
10 gas turbine
11 compressor
12 combustor
13, 31 turbine
14, 32 rotor
15 drive shaft
17, 140 duct
20 heat recovery steam generator
30 steam turbine
40 condenser
50 water supply pump
60 controller
70, 110, 130, 150 distribution duct
71, 111, 131, 151 upstream duct
72, 112, 132, 153 downstream duct
73 variable damper
74, 113, 133 blower fan
76 gas flowmeter
77, 117, 137 gas thermometer
81 turning shaft
82 blade
100 GTCC power plant
114 outside air diffusion pipe
120 contracted portion
125 protrusion
126 ejection hole
152 merging portion

The invention claimed is:
1. A remodeling method of a combined cycle plant,
the combined cycle plant comprising:
 a plurality of gas turbines;
 a plurality of heat recovery steam generators that are provided respectively corresponding to the plurality of gas turbines and configured to recover heat of flue gas discharged from the gas turbines and produce steam by the recovered heat;
 a plurality of ducts configured to guide the flue gas from the gas turbines toward the corresponding heat recovery steam generators; and
 a steam turbine configured to be rotationally driven by the steam produced by the heat recovery steam generators,
the remodeling method comprising:
removing the plurality of gas turbines and the plurality of ducts;
installing, in place of the removed gas turbines, at least one new gas turbine that is higher in efficiency and fewer in number than the removed gas turbines; and installing, in place of the removed ducts, a distribution duct configured to distribute and guide the flue gas from the new gas turbine to the heat recovery steam generators, wherein the distribution duct installed in the installation of the distribution duct is provided with a cooling device configured to cool the flue gas discharged from the new gas turbine, and the cooling device includes at least one of a blower fan configured to send air by taking in outside air, an ejector configured to take in outside air, and a heat exchanger.

2. The remodeling method of a combined cycle plant according to claim 1, wherein the installation of the new gas turbine is performed after the removal of the plurality of the gas turbines, and the installation of the new gas turbine includes installing the new gas turbine in a former site of the gas turbines removed in the removal.

3. The remodeling method of a combined cycle plant according to claim 1, wherein the installation of the new gas turbine is performed before the removal of the plurality of the gas turbines, and the installation of the new gas turbine includes installing the new gas turbine in a vacant site.

4. The remodeling method of a combined cycle plant according to claim 3, wherein each of the heat recovery steam generators is a vertical heat recovery steam generator in which the flue gas flows from a lower side to an upper side in a vertical direction, and in the installation of the distribution duct, pre-remodeling connection positions at which the ducts before remodeling are connected to the heat recovery steam generators and post-remodeling connection positions at which the distribution duct after remodeling is connected to the heat recovery steam generators are different positions.

5. The remodeling method of a combined cycle plant according to claim 1, wherein the combined cycle plant is a multi-shaft combined cycle plant in which a rotating shaft of the gas turbine and a rotating shaft of the steam turbine are separate from each other.

6. A remodeling method of a combined cycle plant, the combined cycle plant comprising:
a plurality of gas turbines;
a plurality of heat recovery steam generators that are provided respectively corresponding to the plurality of gas turbines and configured to recover heat of flue gas discharged from the gas turbines and produce steam by the recovered heat;
a plurality of ducts configured to guide the flue gas from the gas turbines toward the corresponding heat recovery steam generators; and
a steam turbine configured to be rotationally driven by the steam produced by the heat recovery steam generators, the remodeling method comprising:

removing one or more of the gas turbines and removing the plurality of ducts while leaving at least one of the gas turbines;

installing, in place of the removed gas turbines, at least one new gas turbine that is higher in efficiency than the removed gas turbines; and installing, in place of the removed ducts, a distribution duct configured to merge the flue gas from the at least one left gas turbine and the flue gas from the new gas turbine together, and distribute and guide the merged flue gas to the plurality of heat recovery steam generators.

* * * * *